(12) United States Patent
Bruchmann et al.

(10) Patent No.: US 7,858,732 B2
(45) Date of Patent: *Dec. 28, 2010

(54) HIGHLY FUNCTIONAL, HIGHLY BRANCHED OR HYPERBRANCHED POLYESTERS, THE PRODUCTION THEREOF AND THE USE OF THE SAME

(75) Inventors: Bernd Bruchmann, Freinsheim (DE); Jean-Francois Stumbe, Strasbourg (FR); Harald Schaefer, Mannheim (DE); Joelle Bedat, Offendorf (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/501,230

(22) Filed: Jul. 10, 2009

(65) Prior Publication Data

US 2009/0281271 A1    Nov. 12, 2009

Related U.S. Application Data

(62) Division of application No. 11/569,364, filed as application No. PCT/EP2005/005631 on May 25, 2005.

(30) Foreign Application Priority Data

Jun. 1, 2004 (DE) .................. 10 2004 026 904

(51) Int. Cl.
C08G 63/02 (2006.01)
(52) U.S. Cl. .................. 528/272; 528/271; 528/275; 528/300; 528/302; 528/306; 525/437; 525/444; 428/480
(58) Field of Classification Search .......... 528/271, 528/272, 275, 279, 295.5, 296, 300, 301, 528/302, 303, 306, 308.1; 428/480; 525/437, 525/444
See application file for complete search history.

(56) References Cited

U.S. PATENT DOCUMENTS

| | | | |
|---|---|---|---|
| 3,288,732 | A | 11/1966 | Chapman et al. |
| 4,370,441 | A | 1/1983 | Gaske et al. |
| 4,749,728 | A | 6/1988 | Craun et al. |
| 6,555,226 | B1 * | 4/2003 | Kulzick et al. .............. 428/413 |
| 6,569,956 | B1 | 5/2003 | Ramesh |
| 7,081,509 | B2 | 7/2006 | Wagner et al. |
| 7,148,293 | B2 * | 12/2006 | Stumbe et al. .............. 525/437 |

FOREIGN PATENT DOCUMENTS

| | | |
|---|---|---|
| DE | 19 544 737 | 12/1995 |
| DE | 101 63 163 | 7/2003 |
| DE | 102 19 508 | 11/2003 |
| DE | 102 40 817 | 3/2004 |
| EP | 0 680 981 | 11/1995 |
| EP | 1 070 748 | 1/2001 |
| EP | 0 799 279 | 3/2001 |
| EP | 1 109 775 | 4/2003 |
| EP | 1 334 989 | 8/2003 |
| JP | 6 108 027 | 4/1994 |
| WO | 93 17060 | 9/1993 |
| WO | 98 17123 | 4/1998 |
| WO | 01 46296 | 6/2001 |
| WO | 02 34814 | 5/2002 |
| WO | 02 36697 | 5/2002 |
| WO | WO 03054204 | 7/2003 |
| WO | 03 070843 | 8/2003 |
| WO | 03 070844 | 8/2003 |
| WO | 03 093002 | 11/2003 |
| WO | 03 093343 | 11/2003 |
| WO | WO 2004/020503 | 3/2004 |
| WO | WO 2004020503 A1 * | 3/2004 |

OTHER PUBLICATIONS

Teng Qiu, et al., "Modification of End-Groups of Aliphatic Hyperbranched Polyester", Polymers for Advanced Technologies, vol. 15, No. 1/2, XP 001224338, pp. 65-69, 2004.

Ajay Kumar, et al., "Versatile Route to Polyol Polyesters by Lipase Catalysis", Macromolecules, vol. 36, XP 002345506, pp. 8219-8221, 2003.

Hongyong Fu, et al., "Physical Characterization of Sorbitol or Glycerol Containing Aliphatic Copolyesters Synthesized by Lipase-Catalyzed Polymerization", Macromolecules, vol. 36, XP 002345507, pp. 9804-9808, 2003.

Becker/Braun, Kunststoff-Handbuch, vol. 3/1, Polycarbonate, Polyacetale, Polyester, Celluloseester, Carl-Hanser-Verlag, pp. 9-116, 1992.

Becker/Braun, Kunststoff-Handbuch, vol. 7, Polyurethane, Carl-Hanser-Verlag, pp. 67-75, 1993.

Ankur S. Kulshrestha, et al., "Glycerol Containing Polyesters by Direct Lipase-Catalyzed Polycondensations: Synthesis and Characterization", Polymer Preprints, vol. 44, No. 2, pp. 635-636, 2003.

Hongyong Fu, et al., "Physical Characterization of Sorbitol or Glycerol Containing Aliphatic Copolyesters Synthesized by Lipase-Catalyzed Polymerization", Macromolecules, vol. 36, pp. 9804-9808, 2003.

Paul J. Flory, "Molecular Size Distribution in Three Dimensional Polymers. VI. Branched Polymers Containing A-R-Bf-1 Type Units", J. Am. Chem. Soc. vol. 74, pp. 2718-2723, 1952.

Alexander Sunder, et al., "Controlling the Growth of Polymer Trees: Concepts and Perspectives for Hyperbranched Polymers", Chem, Eur. J. vol. 6, No. 14, pp. 2499-2506, 2000.

* cited by examiner

Primary Examiner—Ling-Siu Choi
Assistant Examiner—Frances Tischler
(74) Attorney, Agent, or Firm—Oblon, Spivak, McClelland, Maier & Neustadt, L.L.P.

(57) ABSTRACT

High-functionality highly branched or hyperbranched polyesters based on di-, tri- or polycarboxylic acids and di-, tri- or polyols, processes for preparing them, and their use.

19 Claims, No Drawings

HIGHLY FUNCTIONAL, HIGHLY BRANCHED OR HYPERBRANCHED POLYESTERS, THE PRODUCTION THEREOF AND THE USE OF THE SAME

The present invention relates to high-functionality highly branched or hyperbranched polyesters of specific construction, based on di-, tri- or polycarboxylic acids and di-, tri- or polyols, to processes for preparing them, and to their use.

The high-functionality highly branched or hyperbranched polyesters of the invention can be used with advantage industrially as, among other things, adhesion promoters, in printing inks for example, as thixotropic agents or as building blocks for preparing polyaddition or polycondensation polymers, in for example paints, coverings, adhesives, sealants, casting elastomers or foams, and also as a constituent of binders, together if appropriate with other components such as, for example, isocyanates, epoxy-functional binders or alkyd resins, in adhesives, printing inks, coatings, foams, coverings and paints.

Polyesters are customarily obtained from the reaction of carboxylic acids with alcohols. Of industrial significance are aromatic polyesters, i.e., polyesters having an acid component in which at least one carboxyl group is attached to an aromatic ring, which are prepared, for example, from phthalic, isophthalic or terephthalic acid and from ethanediol, propanediol or butanediol, and aliphatic polyesters, i.e., polyesters having an acid component in which all of the carboxyl groups are attached to aliphatic or cycloaliphatic carbon atoms, prepared from succinic acid, glutaric acid or adipic acid with ethanediol, propanediol, butanediol, pentanediol or hexanediol. In this connection see also Becker/Braun, Kunststoff-Handbuch Vol. 3/1, Polycarbonates, Polyacetals, Polyesters, Cellulose Esters, Carl-Hanser-Verlag, Munich 1992, pages 9-116 and Becker/Braun, Kunststoff-Handbuch Vol. 7, Polyurethanes, Carl-Hanser-Verlag, Munich 1993, pages 67-75. The aromatic or aliphatic polyesters described here are generally of linear construction, strictly difunctional, or else with a low degree of branching.

Polyesters having an OH functionality of more than two are likewise known. Thus WO 02/34814 describes a process for preparing polyesters using up to 3 mol % of a trifunctional alcohol or of a trifunctional carboxylic acid.

In view of the low proportion of trifunctional alcohol in that case, however, the degree of branching achieved is no more than low.

U.S. Pat. No. 4,749,728 describes a process for preparing a polyester from trimethylolpropane and adipic acid. The process is carried out in the absence of solvents and catalysts. The water formed during the reaction is removed by simple distillation. The products obtained in this way can be reacted, for example, with epoxides and processed to thermosetting coating systems.

The exclusive use of trifunctional alcohol in this case may result very quickly in crosslinking, which becomes visible through gelling or through the formation of insoluble fractions.

EP-A 0 680 981 discloses a process for synthesizing polyester polyols which comprises heating a polyol, glycerol for example, and adipic acid at 150-160° C. in the absence of catalysts and solvents. Products are obtained which are suitable as polyester polyol components for rigid polyurethane foams.

WO 98/17123 discloses a process for preparing polyesters of glycerol and adipic acid which are used in chewing gum masses. They are obtained by a solvent-free process without using catalysts. After 4 hours gels begin to form in this case.

Gelatinous polyester polyols, however, are unwanted for numerous applications such as printing inks and adhesives, for example, since they can lead to lumps forming and they detract from the dispersing properties.

Gelling of this kind can be traced back to crosslinking, which is manifested in a high viscosity.

The abovementioned WO 02/34814 describes the preparation of polyesterols with low degrees of branching for powder coating materials by reaction of aromatic dicarboxylic acids together with aliphatic dicarboxylic acids and diols and also with small amounts of a branching agent, such as a triol or tricarboxylic acid, for example.

EP-A 776 920 describes binders formed from polyacrylates and polyesters, it being possible for the latter to comprise, as synthesis components, hexahydrophthalic acid and/or methylhexahydrophthalic acid and also—in some cases optionally—neopentyl glycol, trimethylolpropane, other alkanediols, other dicarboxylic acids and also monocarboxylic and/or hydroxycarboxylic acids in defined proportions.

A disadvantage of the polyesters disclosed therein is that despite the comparatively low molecular weights the viscosities in solution are already very high.

EP 1 334 989 describes the preparation of branched polyesterols of low viscosity for paint applications for increasing the nonvolatiles fraction. In this case mixtures of difunctional carboxylic acids and carboxylic acids of higher functionality (the functionality of the mixture being at least 2.1) are reacted with trifunctional alcohols and aliphatic branched monocarboxylic acids. The polyesters described are to be regarded as branched; however, the essential thing here is seen as being the use of branched monocarboxylic acids, which greatly reduce the viscosity of the system but also increase the unreactive fraction of the polyester. Monocarboxylic acids are added in accordance with EP 1 334 989 either by simultaneous reaction of acid with a functionality of two or more, alcohol with a functionality of three or more and monocarboxylic acid or by two-stage reaction first of alcohol with a functionality of three or more with monocarboxylic acid and then of the resultant reaction product with acid with a functionality of two or more.

A disadvantage of a reaction regime of this kind is that in the first version the monocarboxylic acids are distributed randomly throughout the polyester as a whole and act as chain terminators, resulting in a low molecular weight and a broad spread in the molar weight distribution of the product. In the second variant the functionality of the alcohol component is lowered by reaction with the monocarboxylic acids, the linear fraction of the polymer increases significantly, and the properties of the polyester, the solubility or crystallinity for example, are affected.

Polyesters of high functionality and defined construction are a relatively recent phenomenon.

Thus WO 93/17060 (EP 630 389) and EP 799 279 describe dendrimeric and hyperbranched polyesters based on dimethylolpropionic acid, which as an $AB_2$ unit (A=acid group, B=OH group) undergo intermolecular condensation to form polyesters. The synthesis is highly inflexible, since it relies on $AB_2$ units such as dimethylolpropionic acid as the sole ingredient. Moreover, dendrimers are too costly for general use, since the $AB_2$ unit ingredients are already generally expensive, the syntheses are multistage, and exacting requirements are imposed on the purity of the intermediate and end products.

WO 01/46296 describes the preparation of dendritic polyesters in a multistage synthesis starting from a central molecule, such as trimethylolpropane, dimethylolpropionic acid as the AB$_2$ unit, and also a dicarboxylic acid or a glycidyl ester as functionalizing agents. This synthesis likewise relies on the presence of the AB$_2$ unit.

WO 03/070843 and WO 03/070844 describe hyperbranched copolyester polyols based on AB$_2$ or else AB$_3$ units and a chain extender, and used in coatings systems. Examples of ingredients used include dimethylolpropionic acid and caprolactone. Here again one is dependent on an AB$_2$ unit.

EP 1109775 describes the preparation of hyperbranched polyesters having a tetrafunctional central group. In this case, starting from asymmetric tetraols, such as homopentaerythritol, as the central molecule a dendrimerlike product is synthesized which is used in paints. Asymmetric tetraols of this kind, however, are expensive specialty chemicals which are not available commercially in large quantities.

EP 1070748 describes the preparation of hyperbranched polyesters and their use in powder coating materials. The esters, again based on autocondensable monomers such as dimethylolpropionic acid as the AB$_2$ unit, are added, after chain extension if appropriate, to the coating system as flow improvers, in amounts of 0.2%-5% by weight.

DE 101 63 163 and DE 10219508 describe the preparation of hyperbranched polyesters based on an A$_2$+B$_3$ approach. The basis for this principle is to use dicarboxylic acids and triols or tricarboxylic acids and diols. The flexibility of these syntheses is much higher, since one is not reliant on the use of an AB$_2$ unit.

Nevertheless it was desirable to increase further the flexibility of the synthesis for highly branched or hyperbranched polyesters, specifically in connection with the setting of functionalities, solubility behaviors and also melting or glass transition temperatures.

R. A. Gross and coworkers describe syntheses of branched polyesters by reacting dicarboxylic acids with glycerol or sorbitol and aliphatic diols. These syntheses are carried out by means of enzymatic catalysis and lead to "soft" products having a glass transition temperature of between –28° C. and 7° C.: see Polym. Prep. 2003, 44(2), 635), Macromolecules 2003, 36, 8219 and Macromolecules 2003, 36, 9804. The reactions involve enzyme catalysis and generally have long reaction times, which significantly lowers the space/time yield of the reaction and raises the costs for preparing polyesters. Furthermore, only certain monomers, adipic acid, succinic acid, glycerol, sorbitol or octanediol for example, can be reacted with enzymes, while products such as phthalic acids, trimethylolpropane or cyclohexanediol are difficult if not impossible to bring to reaction enzymatically.

The use of highly branched or hyperbranched polyesters in printing inks and printing systems is described in WO 02/36697 or WO 03/93002.

It was an object of the invention to provide, through a technically simple and economical process, aliphatic or aromatic polyesters of high functionality and high degree of branching, whose structures, degree of branching, functionalities and properties, such as solubilities or melt or glass transition temperatures, for example, are readily adaptable to the requirements of the application and which are able to combine advantageous properties, such as high functionality, high reactivity, low viscosity and/or ready solubility.

This object has been achieved in accordance with the invention by reacting dicarboxylic acids or derivatives thereof with a mixture of alcohols having a functionality of two or more or else difunctional alcohols with a mixture of carboxylic acids having a functionality of two or more.

The invention accordingly provides high-functionality highly branched or hyperbranched polyesters having a molecular weight $M_n$ of at least 500 g/mol and a polydispersity $M_w/M_n$ of 1.2-50, obtainable by reacting
at least one aliphatic, cycloaliphatic, araliphatic or aromatic dicarboxylic acid (A$_2$) or derivatives thereof and
at least one divalent aliphatic, cycloaliphatic, araliphatic, or aromatic alcohol (B$_2$), containing 2 OH groups, with either
a) at least one x-valent aliphatic, cycloaliphatic, araliphatic or aromatic alcohol (C$_x$) containing more than two OH groups, x being a number greater than 2, preferably between 3 and 8, particularly preferably between 3 and 6, more preferably from 3 to 4 and in particular 3,
or
b) at least one aliphatic, cycloaliphatic, araliphatic or aromatic carboxylic acid (D$_y$) or derivatives thereof containing more than two acid groups, y being a number greater than 2, preferably between 3 and 8, more preferably between 3 and 6, very preferably from 3 to 4 and in particular 3,
in each case in the presence if appropriate of further functionalized building blocks E
and
c) subsequently reacting the product, if appropriate, with a monocarboxylic acid F, and the ratio of the reactive groups in the reaction mixture being chosen so as to set a molar ratio of OH groups to carboxyl groups or derivatives thereof of from 5:1 to 1:5, preferably from 4:1 to 1:4, more preferably from 3:1 to 1:3 and very preferably from 2:1 to 1:2.

The invention further provides a process for preparing high-functionality highly branched or hyperbranched polyesters of this kind.

By hyperbranched polyesters are meant for the purposes of this invention uncrosslinked polyesters containing hydroxyl and carboxyl groups, which are both structurally and molecularly nonuniform. Uncrosslinked for the purpose of this specification means that the degree of crosslinking present is less than 15% by weight, preferably less than 10% by weight, determined by way of the insoluble fraction of the polymer.

The insoluble fraction of the polymer was determined by extraction for four hours using the same solvent as employed for the gel permeation chromatography, in other words tetrahydrofuran or hexafluoroisopropanol, depending on what solvent has better solvency for the polymer, in a Soxhlet apparatus, drying of the residue to constant weight, and weighing of the remaining residue.

Hyperbranched polyesters may on the other hand be synthesized starting from a central molecule in the same way as for dendrimers but with the chain length of the branches lacking uniformity. On the other hand they can also be of linear construction, with functional side groups, or else, as a combination of the two extremes, may include linear and branched moieties. On the definition of dendrimeric and hyperbranched polymers see also P. J. Flory, J. Am. Chem. Soc. 1952, 74, 2718 and H. Frey et al., Chemistry—A European Journal, 2000, 6, No. 14, 2499.

By "hyperbranched" in connection with the present invention is meant that the degree of branching (DB), in other words the average number of dendritic linkages plus the average number of end groups per molecule, is from 10% to 99.9%, preferably from 20% to 99%, more preferably 20%-95%.

By "dendrimeric" in the context of the present invention is meant that the degree of branching is 99.9%-100%. On the definition of the degree of branching see H. Frey et al., Acta Polym. 1997, 48, 30-35.

Details of the invention now follow:

The dicarboxylic acids ($A_2$) include for example aliphatic dicarboxylic acids, such as oxalic acid, malonic acid, succinic acid, glutaric acid, adipic acid, pimelinic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid. It is also possible additionally to use aromatic dicarboxylic acids, such as phthalic acid, isophthalic acid or terephthalic acid, for example. Unsaturated dicarboxylic acids as well, such as maleic acid or fumaric acid, can be used.

Said dicarboxylic acids may also be substituted by one or more radicals selected from $C_1$-$C_{10}$ alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, trimethylpentyl, n-nonyl or n-decyl, for example, $C_3$-$C_{12}$ cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl, for example; preference is given to cyclopentyl, cyclohexyl and cycloheptyl;

Alkylene groups such as methylene or ethylidene or $C_6$-$C_{14}$ aryl groups such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, for example, preferably phenyl, 1-naphthyl and 2-naphthyl, more preferably phenyl.

Exemplary representatives of substituted dicarboxylic acids that may be mentioned include the following: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

It is also possible to use mixtures of two or more of the aforementioned dicarboxylic acids.

The dicarboxylic acids can be used either as such or in the form of derivatives.

By derivatives are meant preferably the corresponding anhydrides in monomeric or else polymeric form, monoalkyl or dialkyl esters, preferably mono- or di-$C_1$-$C_4$ alkyl esters, more preferably monomethyl or dimethyl esters or the corresponding monoethyl or diethyl esters, additionally monovinyl and divinyl esters, and also mixed esters, preferably mixed esters with different $C_1$-$C_4$ alkyl components, more preferably mixed methyl ethyl esters.

$C_1$-$C_4$ alkyl for the purposes of this specification means methyl, ethyl, isopropyl, n-propyl, n-butyl, isobutyl, sec-butyl and tert-butyl, preferably methyl, ethyl and n-butyl, more preferably methyl and ethyl and very preferably methyl.

Within the context of the present invention it is also possible to use a mixture of a dicarboxylic acid and one or more of its derivatives. Likewise possible within the context of the present invention is to use a mixture of two or more different derivatives of one or more dicarboxylic acids.

Particular preference is given to using malonic acid, succinic acid, glutaric acid, adipic acid, 1,2-, 1,3- or 1,4-cyclohexanedicarboxylic acid (hexahydrophthalic acids), phthalic acid, isophthalic acid, terephthalic acid or the monoalkyl or dialkyl esters thereof.

Examples of tricarboxylic or polycarboxylic acids ($D_y$) that can be reacted include aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid) and also mellitic acid and low molecular weight polyacrylic acids.

Tricarboxylic acids or polycarboxylic acids ($D_y$) can be used in the reaction according to the invention either as such or else in the form of derivatives.

By derivatives are meant preferably the corresponding anhydrides in monomeric or else polymeric form, mono-, di- or trialkyl esters, preferably mono-, di- or tri-$C_1$-$C_4$ alkyl esters, more preferably mono-, di- or trimethyl esters or the corresponding mono-, di- or triethyl esters, additionally mono-, di- and trivinyl esters, and also mixed esters, preferably mixed esters having different $C_1$-$C_4$ alkyl components, more preferably mixed methyl ethyl esters.

Within the context of the present invention it is also possible to use a mixture of a tricarboxylic or polycarboxylic acid and one or more of its derivatives, such as a mixture of pyromellitic acid and pyromellitic dianhydride, for example. It is likewise possible within the context of the present invention to use a mixture of two or more different derivatives of one or more tricarboxylic or polycarboxylic acids, such as a mixture of 1,3,5-cyclohexanetricarboxylic acid and pyromellitic dianhydride, for example.

Diols ($B_2$) used in accordance with the present invention include for example ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)-cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, n being an integer and $n \geq 4$, polyethylene-polypropylene glycols, the sequence of the ethylene oxide or propylene oxide units being blockwise or random, polytetramethylene glycols, preferably with a molar weight of up to 5000 g/mol, poly-1,3-propanediols, preferably with a molar weight up to 5000 g/mol, polycaprolactones, or mixtures of two or more representatives of the above compounds. Either one or both hydroxyl groups in the abovementioned diols may be substituted by SH groups. Diols whose use is preferred are ethylene glycol, 1,2-propanediol, 1,3-propanediol, 1,4-butanediol, 1,5-pentanediol, 1,6-hexanediol, 1,8-octanediol, 1,2-, 1,3- and 1,4-cyclohexanediol, 1,3- and 1,4-bis(hydroxymethyl)cyclohexane, and diethylene glycol, triethylene glycol, dipropylene glycol and tripropylene glycol.

The dihydric alcohols $B_2$ may optionally also comprise further functionalities such as carbonyl, carboxyl, alkoxycarbonyl or sulfonyl, for example, such as dimethylolpropionic acid or dimethylolbutyric acid, for example, and also their $C_1$-$C_4$ alkyl esters, though preferably the alcohols $B_2$ contain no further functionalities.

Alcohols with a functionality of at least three ($C_x$) comprise glycerol, trimethylolmethane, trimethylolethane, trimethylolpropane, 1,2,4-butanetriol, tris(hydroxymethyl) amine, tris(hydroxyethyl)amine, tris(hydroxypropyl)amine, pentaerythritol, diglycerol, triglycerol or higher condensates of glycerol, di(trimethylolpropane), di(pentaerythritol), trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as sorbitol, mannitol, threitol, erythritol, adonitol (ribitol), arabitol (lyxitol), xylitol, dulcitol (galactitol), maltitol, isomalt, polyetherols with a functionality of three or more, based on alcohols with a functionality of three or more and on ethylene oxide, propylene oxide and/or butylene oxide.

Particular preference is given here to glycerol, diglycerol, triglycerol, trimethylolethane, trimethylolpropane, 1,2,4-butanetriol, pentaerythritol, tris(hydroxyethyl) isocyanurate and also polyetherols thereof based on ethylene oxide and/or propylene oxide.

The process of the invention can be carried out in bulk or in the presence of a solvent. Examples of suitable solvents include hydrocarbons such as paraffins or aromatics. Particularly suitable paraffins are n-heptane and cyclohexane. Particularly suitable aromatics are toluene, ortho-xylene, meta-xylene, para-xylene, xylene isomer mixture, ethylbenzene, chlorobenzene and ortho- and meta-dichlorobenzene. Of further suitability as solvents in the absence of acidic catalysts are, very preferably, ethers, such as dioxane or tetrahydrofuran, for example, and ketones such as methyl ethyl ketone and methyl isobutyl ketone, for example.

The amount of solvent added is in accordance with the invention at least 0.1% by weight, based on the mass of the starting materials employed that are to be reacted, preferably at least 1% by weight and more preferably at least 10% by weight. It is also possible to use excesses of solvent, based on the mass of starting materials employed that are to be reacted, such as from 1.01 to 10 times. Solvent amounts of more than 100 times, based on the mass of starting materials employed that are to be reacted, are not advantageous, since at significantly lower reactant concentrations the reaction rate subsides significantly, leading to uneconomically long reaction times.

In one preferred embodiment the reaction is carried out free from solvent.

To carry out the process of the invention it is possible to operate in the presence of a water-removing agent, as an additive added at the beginning of the reaction. Suitable examples include molecular sieves, especially molecular sieve 4 Å, $MgSO_4$ and $Na_2SO_4$. It is also possible during the reaction to add further water remover or to replace water remover by fresh water remover. It is also possible to remove water and/or alcohol formed, during the reaction, by distillation and, for example, to use a water separator, in which case the water is removed with the aid of an azeotrope former.

Separation may also take place by stripping: for example, by passing a gas which is inert under the reaction conditions through the reaction mixture, additionally, if appropriate, to a distillation. Suitable inert gases include preferably nitrogen, noble gases, carbon dioxide or combustion gases.

The process of the invention can be carried out in the absence of catalysts. It is preferred, however, to operate in the presence of at least one catalyst. These are preferably acidic inorganic, organometallic or organic catalysts or mixtures of two or more acidic inorganic, organometallic or organic catalysts.

Acidic inorganic catalysts for the purposes of the present invention are for example sulfuric acid, sulfates and hydrogen sulfates, such as sodium hydrogen sulfate, phosphoric acid, phosphonic acid, hypophosphorous acid, aluminum sulfate hydrate, alum, acidic silica gel (pH$\leq$6, especially $\leq$5) and acidic aluminum oxide. Further acidic inorganic catalysts which can be used include, for example, aluminum compounds of the general formula $Al(OR^1)_3$ and titanates of the general formula $Ti(OR^1)_4$, it being possible for the radicals $R^1$ to be identical or different in each case and to be selected independently of one another from $C_1$-$C_{20}$ alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, for example, $C_3$-$C_{12}$ cycloalkyl radicals, such as cyclopropyl, cyclobutyl, cyclopentyl, cyclohexyl, cycloheptyl, cyclooctyl, cyclononyl, cyclodecyl, cycloundecyl and cyclododecyl, for example; preferably cyclopentyl, cyclohexyl and cycloheptyl.

The radicals $R^1$ in $Al(OR^1)_3$ and/or $Ti(OR^1)_4$ are preferably each identical and selected from n-butyl, isopropyl and 2-ethylhexyl.

Preferred acidic organometallic catalysts are chosen for example from dialkyltin oxides $R^1_2SnO$ or dialkyltin esters $R^1_2Sn(OR^2)_2$, in which $R^1$ is as defined above and can be identical or different.

$R^2$ can have the same definitions as $R^1$ and additionally can be $C_6$-$C_{12}$ aryl; phenyl, o-, m- or p-tolyl, xylyl or naphthyl, for example. $R^2$ can in each case be identical or different.

Examples of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, dibutyltin dimaleate or dioctyltin diacetate.

Particularly preferred representatives of acidic organometallic catalysts are dibutyltin oxide, diphenyltin oxide and dibutyltin dilaurate.

Preferred acidic organic catalysts are acidic organic compounds containing, for example, phosphate groups, sulfonic acid groups, sulfate groups or phosphonic acid groups. Particular preference is given to sulfonic acids such as paratoluene sulfonic acid, for example. Acidic ion exchangers can also be used as acidic organic catalysts, examples being polystyrene resins which contain sulfonic acid groups and have been crosslinked with about 2 mol % of divinylbenzene.

Combinations of two or more of the aforementioned catalysts can also be employed. A further possibility is to use organic or organometallic or else inorganic catalysts that are in the form of discrete molecules in an immobilized form, on silica gel or on zeolites, for example.

If it is desired to use acidic inorganic, organometallic or organic catalysts then the amount of catalyst used is in accordance with the invention from 0.1% to 10% by weight, preferably from 0.2% to 2% by weight.

Enzymes or their decomposition products are not included among the acidic organic catalysts for the purposes of the present invention. Likewise the dicarboxylic acids reacted in accordance with the invention are not included among the acidic organic catalysts for the purposes of the present invention.

For carrying out the process of the invention it is advantageous to forego the use of enzymes.

The process of the invention is carried out preferably under an inert gas atmosphere, i.e., a gas which is inert under the reaction conditions, such as under carbon dioxide, combustion gases, nitrogen or noble gas, for example, among which argon may be mentioned in particular.

The process of the invention is carried out at temperatures from 60 to 250° C. It is preferred to operate at temperatures from 80 to 200° C., more preferably at 100 to 180° C.

The pressure conditions of the process of the invention are not generally critical. It is possible to operate at a significantly reduced pressure, such as at from 10 to 500 mbar, for example. The process of the invention can also be carried out at pressures above 500 mbar. Preference is given, on grounds of simplicity, to reaction at atmospheric pressure; also possible, however, is its implementation at a slightly elevated pressure, up to 1200 mbar for example. It is also possible to operate under significantly increased pressure, at pressures of up to 10 bar, for example. Reaction under reduced or atmospheric pressure is preferred, particular preference being given to atmospheric pressure.

The reaction time of the process of the invention is normally from 10 minutes to 48 hours, preferably from 30 minutes to 24 hours and more preferably from 1 to 12 hours.

After the end of the reaction the high-functionality highly branched and hyperbranched polyesters can be isolated easily, by for example filtering off the catalyst and stripping off the solvent if appropriate, in which case the stripping of the solvent is normally carried out under reduced pressure. Further highly suitable workup methods are precipitation of the polymer following addition of water and subsequent washing and drying.

d) The reaction mixture can be subjected if necessary to a decolorizing operation, by treatment for example with activated carbon or metal oxides, such as alumina, silica, magnesium oxide, zirconium oxide, boron oxide or mixtures thereof, in amounts of for example 0.1%-50% by weight, preferably 0.5% to 25% by weight, more preferably 1%-10% by weight and at temperatures of for example 10 to 200° C., preferably 20 to 180° C. and more preferably 30 to 160° C.

This can be done by adding the decolorizer in powder or granule form to the reaction mixture, followed by filtration, or by passing the reaction mixture over a bed of the decolorizer in the form of any desired, suitable shapes.

The reaction mixture can be decolorized at any point in the workup procedure: for example, at the stage of the crude reaction mixture, or after any preliminary washing, neutralization, wash or removal of solvent.

The reaction mixture may further be subjected to a preliminary wash e) and/or a neutralization f) and/or a subsequent wash g), preferably just a neutralization f). If appropriate, the order in which neutralization f) and preliminary wash e) are carried out can also be reversed.

From the aqueous phase from washing and/or neutralization it is possible for products of value that are present to be at least partly recovered by acidification and extraction with a solvent, and used again.

For the preliminary or subsequent wash the reaction mixture is treated in a scrubber with a wash liquid, which is, for example, water or a 5%-30% strength by weight, preferably 5%-20%, more preferably 5%-15% strength by weight solution of sodium chloride, potassium chloride, ammonium chloride, sodium sulfate or ammonium sulfate, preferably water or sodium chloride solution.

The reaction mixture to wash liquid ratio is generally 1:0.1-1, preferably 1:0.2-0.8, more preferably 1:0.3-0.7.

Washing or neutralization may be carried out, for example, in a stirred tank or in other conventional apparatus, such as in a column or mixer-settler apparatus, for example.

For washing or neutralization in the process of the invention it is possible, in terms of process engineering, to use any of the extraction and washing techniques and apparatus that are known per se, examples being those described in Ullmann's Encyclopedia of Industrial Chemistry, 6th ed, 1999 Electronic Release, Chapter: Liquid—Liquid Extraction—Apparatus. These may be, for example, single-stage or multistage, preferably single-stage, extractions, and also extractions carried out in cocurrent or countercurrent mode, preferably in countercurrent mode.

Preference is given to using sieve tray columns or columns packed with stacked or dumped packings, or else to using stirred tanks or mixer-settler apparatus, and also pulsed columns or those having rotating internals.

The preliminary wash is preferably employed when metal salts, preferably organotin compounds, are (among) the catalysts used.

A subsequent wash may be advantageous in order to remove traces of base or salt from the neutralized reaction mixture.

For the neutralization f) the reaction mixture, after preliminary washing if appropriate, said mixture possibly still comprising small amounts of catalyst and/or carboxylic acid, can be neutralized with an aqueous solution of a base having a strength of 5%-25%, preferably 5%-20%, more preferably 5%-15% by weight, such as, for example, alkali metal or alkaline earth metal oxides, hydroxides, carbonates or hydrogencarbonates, preferably sodium hydroxide, potassium hydroxide, sodium hydrogencarbonate, sodium carbonate, potassium hydrogencarbonate, calcium hydroxide, milk of lime, ammonia, aqueous ammonia or potassium carbonate, to which if appropriate 5%-15% by weight of sodium chloride, potassium chloride, ammonium chloride or ammonium sulfate may have been added; more preferably with sodium hydroxide or sodium hydroxide/sodium chloride solution. The degree of neutralization is preferably from 5 to 60 mol %, more preferably from 10 to 40 mol %, very preferably from 20 to 30 mol %, based on the monomers comprising acid groups.

The base is added such that the temperature in the apparatus does not rise above 60° C., remaining preferably between 20 and 35° C., and the pH is 4-13. The heat of neutralization is removed preferably by cooling the vessel by means of internal cooling coils or via double-jacket cooling.

The reaction mixture to neutralization liquid ratio is generally 1:0.1-1, preferably 1:0.2-0.8, more preferably 1:0.3-0.7.

As far as the apparatus is concerned, the comments made above apply.

h) If a solvent is present in the reaction mixture it can be removed substantially by means of distillation. Preferably any solvent present is removed from the reaction mixture after washing and/or neutralization; if desired, however, this can also be done before washing and/or neutralization.

For this purpose it is possible to add to the reaction mixture a storage stabilizer in an amount such that after the solvent has been removed the residue thereof in the target ester is 100-500 ppm, preferably 200-500 ppm and more preferably 200-400 ppm.

The distillative separation of the major amount of any solvent used or any low-boiling by-products takes place for example in a stirred tank with double-jacket heating and/or internal heating coils under reduced pressure, at for example 20-700 mbar, preferably 30 to 500 mbar and more preferably 50-150 mbar and at a temperature of 40-120° C.

The distillation can of course also take place in a falling-film or thin-film evaporator. For this purpose the reaction mixture, preferably two or more times in circulation, is passed through the apparatus under reduced pressure, for example, at 20-700 mbar, preferably 30 to 500 mbar and more preferably 50-150 mbar and at a temperature of 40-80° C.

An advantageous possibility is to introduce into the distillation apparatus a gas which is inert under the reaction conditions, such as 0.1-1, preferably 0.2-0.8 and more preferably 0.3-0.7 m$^3$ of oxygen-containing gas per m$^3$ of reaction mixture per hour.

The residue solvent content in the residue after distillation is generally less than 5% by weight, preferably 0.5%-5% and more preferably 1% to 3% by weight.

The solvent separated is condensed and preferably used again.

Distillation can be replaced or supplemented if necessary by solvent stripping i).

For that purpose the product, possibly still comprising small amounts of solvent or low-boiling impurities, is heated at 50-150° C., preferably 80-150° C., and the remaining amounts of solvent are removed using a suitable gas in a suitable apparatus. Reduced pressure may also be applied to assist the process, if appropriate.

Examples of suitable apparatus include columns of conventional design, containing the usual internals, e.g., trays, dumped packings or ordered packings, preferably dumped packings. Suitable column internals include in principle all customary internals, examples being trays, stacked packings and/or dumped packings. Among the trays, preference is given to bubble trays, sieve trays, valve trays, Thormann trays and/or dual-flow trays; among the dumped packings, those comprising rings, coils, saddles, Raschig, Intos or Pall rings, barrel saddles or Intalox saddles, Top-Pak, etc., or meshes are preferred.

Also suitable here is a falling-film, thin-film or wiped-film evaporator, such as a Luwa, Rotafilm or Sambay evaporator, which may be equipped with a demister, for example, as a splashguard.

Suitable gases are gases which are inert under the stripping conditions, especially those which have been conditioned to a temperature of 50 to 100° C.

The amount of stripping gas is for example 5-20, more preferably 10-20 and very preferably 10 to 15 m$^3$ of stripping gas per m$^3$ of reaction mixture per hour.

If necessary, at any desired stage in the workup process, preferably after washing/neutralization and, if appropriate, after solvent removal, the esterification mixture may be subjected to a filtration j) in order to remove traces of precipitated salts and also any decolorizer present.

It is preferred to omit a preliminary or subsequent wash e) or g); just a filtration step j) may be sensible. It is likewise preferred to forego a neutralization f).

The sequence of steps e)/g), and also h) and j), is arbitrary.

The present invention further provides the high-functionality highly branched or hyperbranched polyesters obtainable by the process of the invention. These polyesters are distinguished by particularly low fractions of discoloration and resinification.

The polyesters of the invention have a molecular weight $M_n$ of at least 500, preferably at least 600 and more preferably 750 g/mol. The upper limit of the molecular weight $M_n$ is preferably 100 000 g/mol, more preferably it is not more than 80 000 g/mol and with very particular preference it is not more than 30 000 g/mol.

The figures given for polydispersity and also for the number-average and weight-average molecular weight $M_n$ and $M_w$ refer here to measurements made by gel permeation chromatography using polymethyl methacrylate as the standard and tetrahydrofuran or hexafluoroisopropanol as the eluent. The method is described in Analytiker Taschenbuch Vol. 4, pages 433 to 442, Berlin 1984.

The polydispersity of the polyesters of the invention is from 1.2 to 50, preferably from 1.4 to 40, more preferably from 1.5 to 30 and very preferably up to 10.

The solubility of the polyesters of the invention is normally very good; that is, clear solutions at 25° C. can be prepared with an amount of up to 50% by weight, in some cases even up to 80% by weight, of the polyesters of the invention in tetrahydrofuran (THF), ethyl acetate, n-butyl acetate, ethanol and numerous other solvents, without gel particles being visible to the naked eye. This demonstrates the low degree of crosslinking of the polyesters of the invention.

The high-functionality highly branched and hyperbranched polyesters of the invention are carboxy-terminated, carboxy- and hydroxy-terminated and preferably hydroxy-terminated, and can be used with advantage for producing, for example, adhesives, printing inks, coatings, foams, coverings and paints.

In a further aspect the present invention provides for the use of the high-functionality highly branched and hyperbranched polyesters of the invention for preparing polyaddition or polycondensation products, such as polycarbonates, polyurethanes, polyesters and polyethers, for example. Preference is given to using the hydroxy-terminated high-functionality highly branched and hyperbranched polyesters of the invention for preparing polycarbonates, polyesters or polyurethanes.

In another aspect the present invention provides for the use of the high-functionality highly branched and hyperbranched polyesters of the invention and also of the polyaddition or polycondensation products prepared from high-functionality highly branched and hyperbranched polyesters as a component of printing inks, adhesives, coatings, foams, coverings and paints.

In another aspect the present invention provides printing inks, adhesives, coatings, foams, coverings and paints comprising at least one high-functionality highly branched or hyperbranched polyester of the invention or comprising polyaddition or polycondensation products prepared from the high-functionality highly branched and hyperbranched polyesters of the invention, these products being distinguished by outstanding performance properties.

In a further, preferred aspect the present invention provides printing inks, especially packaging inks for flexographic and/or gravure printing, which comprise at least one solvent or a mixture of different solvents, at least one colorant, at least one polymeric binder and, optionally, further additives, at least one of the polymeric binders comprising a highly branched or hyperbranched high-functionality polyester of the invention.

Within the context of the present invention the highly branched and hyperbranched polyesters of the invention can also be used in a mixture with other binders. Examples of further binders for the printing inks of the invention comprise polyvinylbutyral, nitrocellulose, polyamides, polyurethanes, polyacrylates or polyacrylate copolymers. A combination which has proven particularly advantageous is that of the highly branched and hyperbranched polyesters with nitrocellulose. The total amount of all the binders in the printing ink of the invention is normally 5%-35% by weight, preferably 6%-30% by weight and more preferably 10%-25% by weight, based on the sum of all the constituents. The ratio of highly branched and hyperbranched polyester to the total amount of all the binders is normally in the range from 30% by weight to 100% by weight, preferably at least 40% by weight, but the amount of highly branched and hyperbranched polyester should not in general be below 3% by weight, preferably 4% by weight and more preferably 5% by weight relative to the sum of all the constituents of the printing ink.

A single solvent or else a mixture of two or more solvents can be used. Solvents suitable in principle include the customary solvents for printing inks, especially packaging inks. Particularly suitable as solvents for the printing ink of the invention are alcohols such as, for example, ethanol, 1-propanol, 2-propanol, ethylene glycol, propylene glycol, diethylene glycol, substituted alcohols such as ethoxypropanol and esters such as ethyl acetate, isopropyl acetate, and n-propyl or n-butyl acetate, for example. Water is also a suitable solvent in principle. Particularly preferred solvents are ethanol or mixtures composed predominantly of ethanol, and ethyl acetate. Among the solvents possible in principle the skilled worker will make an appropriate selection in accordance with the solubility properties of the polyester and with the desired properties of the printing ink. It is normal to use from 40% to 80% by weight of solvent relative to the sum of all the constituents of the printing ink.

Colorants which can be used include the customary dyes and, in particular, customary pigments. Examples are inorganic pigments such as titanium dioxide pigments or iron oxide pigments, interference pigments, carbon blacks, metal powders, such as particularly aluminum, brass or copper powder, and also organic pigments such as azo, phthalocyanine or isoindoline pigments. It is of course also possible to use mixtures of different dyes or colorants, and also soluble organic dyes. It is usual to use from 5% to 25% by weight of colorant, relative to the sum of all the constituents.

The packaging ink of the invention may optionally comprise further additives and auxiliaries. Examples of additives and auxiliaries are fillers such as calcium carbonate, aluminum oxide hydrate or aluminum and/or magnesium silicate. Waxes raise the abrasion resistance and serve to enhance the lubricity. Examples are, in particular, polyethylene waxes, oxidized polyethylene waxes, petroleum waxes or ceresin waxes. Fatty acid amides can be used for increasing the surface smoothness. Plasticizers serve to enhance the elasticity of the dried film. Examples are phthalates such as dibutyl phthalate, diisobutyl phthalate, dioctyl phthalate, citric esters or esters of adipic acid. For dispersing the pigments it is possible to use dispersing assistants. In the case of the printing ink of the invention it is possible, advantageously, to do without adhesion promoters, although this is not intended to rule out the use of adhesion promoters. The total amount of all of the additives and auxiliaries normally does not exceed 20% by weight relative to the sum of all the constituents of the printing ink, and is preferably 0%-10% by weight.

The packaging ink of the invention can be prepared in a way which is known in principle, by intensively mixing and/or dispersing the constituents in customary apparatus such as dissolvers, stirred ball mills or a triple-roll mill, for example. Advantageously a concentrated pigment dispersion is first prepared with a portion of the components and a portion of the solvent, and is subsequently processed further to the finished printing ink with additional constituents and further solvent.

In a further preferred aspect the present invention provides print varnishes which comprise at least one solvent or a mixture of different solvents, at least one polymeric binder and, optionally, further additives, at least one of the polymeric binders comprising a highly branched or hyperbranched high-functionality polyester of the invention, and also provides for the use of the print varnishes of the invention for priming, as a protective varnish and for producing multilayer materials.

The print varnishes of the invention of course comprise no colorants, but apart from that have the same constituents as the printing inks of the invention already outlined. The amounts of the remaining components increase correspondingly.

Surprisingly, through the use of printing inks, especially packaging inks, and print varnishes with binders based on highly branched and hyperbranched polyesters, multilayer materials with outstanding adhesion between the individual layers are obtained. The addition of adhesion promoters is no longer necessary. Especially surprising is the fact that without adhesion promoters the results achievable are even better than if adhesion promoters are added. On polar films in particular, distinct improvements were achievable in terms of the adhesion.

The polyesters of the invention can be used as a binder component, in coating materials for example, together if appropriate with other hydroxyl-containing or amino-containing binders, such as with hydroxy (meth)acrylates, hydroxystyryl (meth)acrylates, linear or branched polyesters, polyethers, polycarbonates, melamine resins or urea-formaldehyde resins, for example, together with compounds that are reactive toward carboxyl and/or hydroxyl functions, such as with isocyanates, blocked isocyanates, epoxides, carbonates and/or amino resins, for example, preferably with isocyanates, epoxides or amino resins, more preferably with isocyanates or epoxides and very preferably with isocyanates.

Isocyanates are for example aliphatic, aromatic and cycloaliphatic di- and polyisocyanates having an average NCO functionality of at least 1.8, preferably from 1.8 to 5 and more preferably from 2 to 4, and also their isocyanurates, oxadiazinetriones, iminooxadiazinediones, ureas, biurets, amides, urethanes, allophanates, carbodiimides, uretonimines and uretdiones.

The diisocyanates are preferably isocyanates having 4 to 20 carbon atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)-methane, 1-isocyanato-3,3,5-trimethyl-5-(isocyanatomethyl)cyclohexane (isophorone diisocyanate), 1,3- or 1,4-bis (isocyanatomethyl)cyclohexane or 2,4- or 2,6-diisocyanato-1-methylcyclohexane, and also aromatic diisocyanates such as 2,4- or 2,6-tolylene diisocyanate and isomer mixtures thereof, m- or p-xylylene diisocyanate, 2,4'- or 4,4'-diisocyanatodiphenylmethane and isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Suitable polyisocyanates include polyisocyanates containing isocyanurate groups, uretdione diisocyanates, polyisocyanates containing biuret groups, polyisocyanates containing amide groups, polyisocyanates containing urethane or allophanate groups, polyisocyanates comprising oxadiazinetrione groups or iminooxadiazinedione groups, carbodiimide- or uretonimine-modified polyisocyanates of linear or branched $C_4$-$C_{20}$ alkylene diisocyanates, cycloaliphatic diisocyanates having a total of 6 to 20 carbon atoms or aromatic diisocyanates having a total of 8 to 20 carbon atoms, or mixtures thereof.

The di- and polyisocyanates which can be employed preferably have an isocyanate group content (calculated as NCO, molecular weight=42) of from 1% to 60% by weight, based on the diisocyanate and polyisocyanate (mixture), preferably from 2% to 60% by weight and more preferably from 10% to 55% by weight.

Preference is given to aliphatic and/or cycloaliphatic di- and polyisocyanates, examples being the abovementioned aliphatic and/or cycloaliphatic diisocyanates, or mixtures thereof.

Particular preference is given to hexamethylene diisocyanate, 1,3-bis(isocyanato-methyl)cyclohexane, isophorone diisocyanate and di(isocyanatocyclohexyl)methane, very particular preference to isophorone diisocyanate and hexamethylene diisocyanate, and especial preference to hexamethylene diisocyanate.

Preference extends to

1) Isocyanurate-group-containing polyisocyanates of aromatic, aliphatic and/or cycloaliphatic diisocyanates. Particular preference here goes to the corresponding aliphatic and/or cycloaliphatic isocyanato-isocyanurates and, in particular, to those based on hexamethylene diisocyanate and isophorone diisocyanate. The present isocyanurates are, in particular, tris-isocyanatoalkyl and/or tris-isocyanatocycloalkyl isocyanurates, which represent cyclic trimers of the diisocyanates, or are mixtures with their higher homologues containing more than one isocyanurate ring. The isocyanato-isocyanurates generally have an NCO content of from 10% to 30% by weight, in particular from 15% to 25% by weight, and an average NCO functionality of from 2.6 to 4.5.

2) Uretdione diisocyanates containing aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used in the formulations of the invention as a sole component or in a mixture with other polyisocyanates, especially those mentioned under 1).

3) Polyisocyanates containing biuret groups and aromatically, cycloaliphatically or aliphatically attached, preferably cycloaliphatically or aliphatically attached, isocyanate groups, especially tris(6-isocyanatohexyl)biuret or its mixtures with its higher homologues. These polyisocyanates containing biuret groups generally have an NCO content of from 18% to 23% by weight and an average NCO functionality of from 2.8 to 4.5.

4) Polyisocyanates containing urethane and/or allophanate groups and aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with monohydric or polyhydric alcohols such as for example methanol, ethanol, isopropanol, n-propanol, n-butanol, isobutanol, sec-butanol, tert-butanol, n-pentanol, n-hexanol, n-heptanol, n-octanol, n-decanol, n-dodecanol (lauryl alcohol), 2-ethylhexanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol or polyhydric alcohols as listed above for the polyesterols, or mixtures thereof. These polyisocyanates containing urethane and/or allophanate groups generally have an NCO content of from 12% to 20% by weight and an average NCO functionality of from 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups can be prepared from diisocyanate and carbon dioxide.

6) Polyisocyanates comprising iminooxadiazinedione groups, preferably derived from hexamethylene diisocyanate or isophorone diisocyanate. Polyisocyanates of this kind comprising iminooxadiazinedione groups are preparable from diisocyanates by means of specific catalysts.

7) Carbodiimide-modified and/or uretonimine-modified polyisocyanates.

The polyisocyanates 1) to 7) can be used in a mixture, including if appropriate in a mixture with diisocyanates.

The isocyanate groups of the di- or polyisocyanates may also be in blocked form. Examples of suitable blocking agents for NCO groups include oximes, phenols, imidazoles, pyrazoles, pyrazolinones, triazoles, diketopiperazines, caprolactam, malonic esters or compounds as specified in the publications by Z. W. Wicks, Prog. Org. Coat. 3 (1975) 73-99 and Prog. Org. Coat 9 (1981), 3-28, by D. A. Wicks and Z. W. Wicks, Prog. Org. Coat. 36 (1999), 148-172 and Prog. Org. Coat. 41 (2001), 1-83 and also in Houben-Weyl, Methoden der Organischen Chemie, Vol. XIV/2, 61 ff. Georg Thieme Verlag, Stuttgart 1963.

By blocking or capping agents are meant compounds which transform isocyanate groups into blocked (capped or protected) isocyanate groups, which then, below a temperature known as the deblocking temperature, do not display the usual reactions of a free isocyanate group. Compounds of this kind with blocked isocyanate groups are commonly employed in dual-cure coating materials or in powder coating materials which are cured to completion via isocyanate curing.

Epoxide compounds are those having at least one, preferably at least two, more preferably from two to ten epoxide group(s) in the molecule.

Suitable examples include epoxidized olefins, glycidyl esters (e.g., glycidyl (meth)acrylate) of saturated or unsaturated carboxylic acids or glycidyl ethers of aliphatic or aromatic polyols. Products of this kind are available commercially in large numbers. Particular preference is given to polyglycidyl compounds of the bisphenol A, F or B type and to glycidyl ethers of polyfunctional alcohols, such as that of butanediol, of 1,6-hexanediol, of glycerol and of pentaerythritol. Examples of polyepoxide compounds of this kind are Epikote® 812 (epoxide value: about 0.67 mol/100 g) and Epikote® 828 (epoxide value: about 0.53 mol/100 g), Epikote® 1001, Epikote® 1007 and Epikote® 162 (epoxide value: about 0.61 mol/100 g) from Resolution, Rütapox® 0162 (epoxide value: about 0.58 mol/100 g), Rütapox® 0164

(epoxide value: about 0.53 mol/100 g) and Rütapox® 0165 (epoxide value: about 0.48 mol/100 g) from Bakelite AG, and Araldite DY 0397 (epoxide value: about 0.83 mol/100 g) from Vantico AG.

Carbonate compounds are those having at least one, preferably at least two, more preferably two or three carbonate group(s) in the molecule, comprising preferably terminal $C_1$-$C_{20}$ alkyl carbonate groups, more preferably terminal $C_1$-$C_4$ alkyl carbonate groups, very preferably terminal methyl carbonate, ethyl carbonate or n-butyl carbonate.

Suitability is further possessed by compounds containing active methylol or alkylalkoxy groups, especially methylalkoxy groups, such as etherified reaction products of formaldehyde with amines, such as melamine, urea, etc., phenol/formaldehyde adducts, siloxane or silane groups and anhydrides, as described for example in U.S. Pat. No. 5,770,650.

Among the preferred amino resins, which are known and widespread industrially, particular preference goes to using urea resins and melamine resins, such as urea-formaldehyde resins, melamine-formaldehyde resins, melamine-phenol-formaldehyde resins or melamine-urea-formaldehyde resins.

Suitable urea resins are those which are obtainable by reacting ureas with aldehydes and which if appropriate may be modified.

Suitable ureas are urea, N-substituted or N,N'-disubstituted ureas, such as N-methyl-urea, N-phenylurea, N,N'-dimethylurea, hexamethylenediurea, N,N'-diphenylurea, 1,2-ethylenediurea, 1,3-propylenediurea, diethylenetriurea, dipropylenetriurea, 2-hydroxypropylenediurea, 2-imidazolidinone (ethyleneurea), 2-oxohexahydro-pyrimidine (propyleneurea) or 2-oxo-5-hydroxyhexahydropyrimidine (5-hydroxypropyleneurea).

Urea resins can if appropriate be partly or fully modified, by reaction for example with mono- or polyfunctional alcohols, ammonia and/or amines (cationically modified urea resins) or with (hydrogen)sulfites (anionically modified urea resins), particular suitability being possessed by the alcohol-modified urea resins.

Suitable alcohols for the modification are $C_1$-$C_6$ alcohols, preferably $C_1$-$C_4$ alkyl alcohol and especially methanol, ethanol, isopropanol, n-propanol, n-butanol, isobutanol and sec-butanol.

Suitable melamine resins are those which are obtainable by reacting melamine with aldehydes and which if appropriate may be fully or partly modified.

Particularly suitable aldehydes are formaldehyde, acetaldehyde, isobutyraldehyde and glyoxal.

Melamine-formaldehyde resins are reaction products from the reaction of melamine with aldehydes, examples being the abovementioned aldehydes, especially formaldehyde. If appropriate the resulting methylol groups are modified by etherification with the abovementioned monohydric or polyhydric alcohols. Additionally the melamine-formaldehyde resins may also be modified as described above by reaction with amines, aminocarboxylic acids or sulfites.

The action of formaldehyde on mixtures of melamine and urea or on mixtures of melamine and phenol produces, respectively, melamine-urea-formaldehyde resins and melamine-phenol-formaldehyde resins which can likewise be used in accordance with the invention.

The stated amino resins are prepared by conventional methods.

Examples cited in particular are melamine-formaldehyde resins, including monomeric or polymeric melamine resins and partly or fully alkylated melamine resins, urea resins, e.g., methylolureas such as formaldehyde-urea resins, alkoxyureas such as butylated formaldehyde-urea resins, but also N-methylolacrylamide emulsions, isobutoxymethylacrylamide emulsions, polyanhydrides, such as polysuccinic anhydride, and siloxanes or silanes, such as dimethyldimethoxysilanes, for example.

Particular preference is given to amino resins such as melamine-formaldehyde resins or formaldehyde-urea resins.

The coating materials in which the polyesters of the invention can be employed may be conventional base coats, aqueous base coats, substantially solvent-free and water-free liquid base coats (100% systems), substantially solvent-free and water-free solid base coats (powder coating materials, including pigmented powder coating materials) or substantially solvent-free powder coating dispersions with or without pigmentation (powder slurry base coats). They may be thermally curable, radiation-curable or dual-cure systems, and may be self-crosslinking or externally crosslinking.

After the reaction, in other words without further modification, the high-functionality highly branched polyesters formed by the process of the invention are terminated with hydroxyl groups and/or with acid groups. Their solvency in a variety of solvents is generally good, such as in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate, for example.

A high-functionality polyester in the context of this invention is a product which in addition to the ester groups which link the polymer backbone also carries, terminally and/or pendently, at least three, preferably at least six, more preferably at least ten functional groups. The functional groups are acid groups and/or OH groups. In principle there is no upper limit on the number of terminal or pendent functional groups, although products with a very large number of functional groups may exhibit unwanted properties, such as high viscosity, for example. The high-functionality polyesters of the present invention generally contain not more than 500 terminal and/or pendent functional groups, preferably not more than 100 terminal and/or pendent functional groups.

In one preferred embodiment of the invention the polyester of the invention can be prepared in accordance with variant a) by inserting into the reaction only a small portion, or none, of the total amount of x-valent alcohol $C_x$, such as from 0 to 90%, preferably from 0 to 75%, more preferably from 10 to 66% and very preferably from 25 to 50%, in a first phase of the reaction, i.e., for example, during the first half of the total reaction time, preferably during the first quarter and more preferably during the first 10% of the total reaction time.

The remaining amount of x-valent alcohol $C_x$ is only inserted into the reaction when the aforementioned first phase of the reaction has run its course.

This reaction regime leads to polyesters of the invention which are internally of substantially linear construction, while the branches are located substantially at the chain ends.

In a further preferred embodiment of the invention the polyester of the invention can be prepared in accordance with variant b) by inserting into the reaction only a small portion, or none, of the total amount of y-valent carboxylic acid $D_y$, such as from 0 to 90%, preferably from 0 to 75%, more preferably from 10 to 66% and very preferably from 25 to 50%, in a first phase of the reaction, i.e., for example, during the first half of the total reaction time, preferably during the first quarter and more preferably during the first 10% of the total reaction time.

The remaining amount of y-valent carboxylic acid $D_y$ is only inserted into the reaction when the aforementioned first phase of the reaction has run its course.

This reaction regime likewise leads to polyesters of the invention which are internally of substantially linear construction, while the branches are located substantially at the chain ends.

In a further preferred embodiment of the invention the polyester of the invention can be prepared in accordance with variant a) by inserting into the reaction only a small portion, or none, of the total amount of divalent alcohol $B_2$, such as from 0 to 90%, preferably from 0 to 75%, more preferably from 10 to 66% and very preferably from 25 to 50%, in a first phase of the reaction, i.e., for example, during the first half of the total reaction time, preferably during the first quarter and more preferably during the first 10% of the total reaction time.

The remaining amount of divalent alcohol $B_2$ is only inserted into the reaction when the aforementioned first phase of the reaction has run its course.

This reaction regime leads to polyesters of the invention which are internally of substantially branched construction, whereas essentially linear chains spread out from the branches.

In a further preferred embodiment of the invention the polyester of the invention can be prepared in accordance with variant b) by inserting into the reaction only a small portion, or none, of the total amount of divalent carboxylic acid $A_2$, such as from 0 to 90%, preferably from 0 to 75%, more preferably from 10 to 66% and very preferably from 25 to 50%, in a first phase of the reaction, i.e., for example, during the first half of the total reaction time, preferably during the first quarter and more preferably during the first 10% of the total reaction time.

The remaining amount of divalent carboxylic acid $A_2$ is only inserted into the reaction when the aforementioned first phase of the reaction has run its course.

This reaction regime likewise leads to polyesters of the invention which are internally of substantially branched construction, whereas essentially linear chains spread out from the branches.

In a further preferred embodiment the polyesters of the invention may contain further functional groups in addition to the functional groups already obtained by virtue of the reaction. Functionalization in this context may take place during the buildup of molecular weight or else subsequently, i.e., after the end of the actual reaction in steps a) and b). This means that the conversion of components $A_2$, $B_2$, $C_x$ and/or $D_y$ is concluded at least 75%, preferably at least 80%, more preferably at least 85%, very preferably at least 90%, in particular at least 95% and especially at least 97%. Functionalization with saturated or unsaturated monocarboxylic acids during the molecular weight buildup is ruled out in accordance with the invention.

If, before or during the molecular weight buildup, components are added which as well as hydroxyl or carboxyl groups possess further functional groups or functional elements, then a polyester polymer is obtained which has randomly distributed functionalities different from the carboxyl or hydroxyl groups.

Functional groups may for example additionally be ether groups, carbonate groups, urethane groups, urea groups, thiol groups, thioether groups, thioester groups, keto or aldehyde groups, mono-, di- or trisubstituted amino groups, nitrile or isonitrile groups, carboxamide groups, sulfonamide groups, silane groups or siloxane groups, sulfonic acid, sulfenic acid or sulfinic acid groups, phosphonic acid groups, vinyl or allyl groups or lactone groups.

Effects of this kind can be obtained, for example, by adding functionalized building blocks E as compounds during the polycondensation which besides hydroxyl groups or carboxyl groups carry further functional groups or functional elements, such as mercapto groups, primary, secondary or tertiary amino groups, ether groups, carbonyl groups, sulfonic acids or derivatives of sulfonic acids, sulfinic acids or derivatives of sulfinic acids, phosphonic acids or derivatives of phosphonic acids, phosphinic acids or derivatives of phosphinic acids, silane groups, siloxane groups. For modification by means of amide groups it is possible to make additional use during the esterification of, for example, ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)-aminomethane, tris(hydroxyethyl)aminomethane, ethylenediamine, propylenediamine, hexamethylenediamine or isophoronediamine.

For modification with mercapto groups it is possible for example to use mercaptoethanol. Tertiary amino groups can be generated, for example, by incorporating N-methyldiethanolamine, N-methyldipropanolamine or N,N-dimethylethanolamine. Ether groups can be produced, for example, by condensing in polyetherols with a functionality of two or more. Reaction with long-chain alkanediols allows the introduction of long-chain alkyl radicals, while reaction with alkyl or aryl diisocyanates generates alkyl-, aryl- and urethane-functional polyesters.

Subsequent functionalization is obtainable by reacting the resultant high-functionality highly branched or hyperbranched polyester in an additional process step with a suitable functionalizing reagent which is able to react with the OH and/or carboxyl groups of the polyester.

Functionalization of hydroxyl-containing polyesters of the invention with saturated or unsaturated, aliphatic, cycloaliphatic, araliphatic or aromatic monocarboxylic acids F can take place in accordance with the invention only subsequently, i.e., after the end of the actual reaction in steps a) and b), in a separate step c).

Suitable saturated monocarboxylic acids F may comprise 1 to 30 carbon atoms, preferably 2 to 30, more preferably 4 to 25, very preferably 6 to 20, and in particular 8 to 20 carbon atoms.

Examples of suitable saturated monocarboxylic acids F are formic acid, acetic acid, propionic acid, butyric acid, pivalic acid, caproic acid, 2-ethylhexanoic acid, octanoic acid, isononanoic acid, capric acid, undecanoic acid, lauric acid, myristic acid, pentadecanoic acid, palmitic acid, margaric acid, stearic acid, nonadecanoic acid, arachic acid, behenic acid, oleic acid, linoleic acid, linolenic acid, benzoic acid and α- or β-naphthoic acid.

Suitable α,β-unsaturated monocarboxylic acids F can comprise 3 to 20 carbon atoms, preferably 3 to 10, more preferably 3 to 6, very preferably 3 to 5 and in particular 3 to 4 carbon atoms.

Examples of suitable α,β-unsaturated monocarboxylic acids F are acrylic acid, methacrylic acid, ethacrylic acid, α-chloroacrylic acid, maleic acid, fumaric acid, itaconic acid, crotonic acid, citraconic acid, mesaconic acid or glutaconic acid, preferably acrylic acid, methacrylic acid, maleic acid, fumaric acid, itaconic acid and crotonic acid, more preferably acrylic acid, methacrylic acid, maleic acid, fumaric acid and crotonic acid, very preferably acrylic acid and methacrylic acid and in particular acrylic acid.

The reaction with saturated or unsaturated monocarboxylic acids F can take place with, instead of the carboxylic acids, their derivatives too, for example with their anhydrides, chlorides or esters, preferably with their anhydrides or esters, more preferably with their esters with $C_1$-$C_4$ alkyl alcohols, and very preferably with their methyl esters.

A reaction in the sense of an esterification can take place for example in the presence of at least one esterification catalyst, such as sulfuric acid, aryl- or alkylsulfonic acids or mixtures thereof, for example. Examples of arylsulfonic acids are benzenesulfonic acid, para-toluenesulfonic acid or dodecylbenzenesulfonic acid; examples of alkylsulfonic acids are methanesulfonic acid, ethanesulfonic acid or trifluoromethanesulfonic acid. Strongly acidic ion exchangers or zeolites can also be used as esterification catalysts. Preference is given to sulfuric acid and ion exchangers.

The temperature of the reaction is generally 40-160° C.; it may be sensible to remove water formed during the reaction by means of an azeotrope-forming solvent, such as n-pentane, n-hexane, n-heptane, cyclohexane, methylcyclohexane, benzene, toluene or xylene, for example.

If the water present in the reaction mixture is not removed using an azeotrope-forming solvent then it is possible to remove it by stripping with an inert gas, preferably an oxygen-containing gas, more preferably with air or lean air.

A reaction in the sense of a transesterification can take place for example in the presence of at least one transesterification catalyst, examples being metal chelate compounds of, for example, hafnium, titanium, zirconium or calcium, alkali metal alkoxides and magnesium alkoxides, organotin compounds or calcium and lithium compounds, examples being oxides, hydroxides, carbonates or halides, but preferably titanium alkoxides, magnesium alkoxides or aluminum alkoxides.

The alcohol liberated during the transesterification reaction can be removed for example by distillation, by stripping or by applying reduced pressure.

The reaction temperature amounts in general to 80-140° C.

To prevent a polymerization in the reaction of α,β-unsaturated carboxylic acids or derivatives thereof it may be sensible to operate in the presence of commercially customary polymerization inhibitors, which are known per se to the skilled worker.

Esters of this kind of α,β-unsaturated carboxylic acids with the polyesters of the invention can be employed for example in radiation-curable coating materials.

Hydroxyl-comprising high-functionality highly branched or hyperbranched polyesters can be modified for example by adding molecules comprising isocyanate groups. By way of example it is possible to obtain polyesters comprising urethane groups by reaction with alkyl or aryl isocyanates.

Additionally it is possible to convert hydroxyl-comprising high-functionality polyesters into high-functionality polyester-polyether polyols by reaction with alkylene oxides, such as ethylene oxide, propylene oxide or isobutylene oxide, for example. These compounds may then be obtained, for example, in water-soluble form.

The polyesters obtainable in accordance with the invention generally have a viscosity of not more than 100 Paxs (measured at 80° C. in accordance with DIN EN 3219).

The polyesters obtainable in accordance with the invention generally have a glass transition temperature of from −40 to 100° C.

The polyesters obtainable in accordance with the invention possess a sum of acid number and OH number according to DIN 53240, part 2 of up to 500 mg KOH/g.

The glass transition temperature $T_g$ is determined by the DSC method (differential scanning calorimetry) in accordance with ASTM 3418/82.

In one preferred embodiment of the present invention polyesters of the invention having a $T_g$ of from −40 to 60° C. are used in printing inks, since in this case in particular the resulting printing ink exhibits good adhesion to the substrate in combination if appropriate with bond strength with respect to a top layer.

In one preferred embodiment of the present invention polyesters of the invention having a glass transition temperature $T_g$ of at least 0° C. are used in coating materials and paints. This range of glass transition temperature is advantageous for achieving, for example, sufficient film hardness and chemical resistance.

EXAMPLES

Examples of Inventive Highly Branched or Hyperbranched Polyesters

Example 1

Polyester Formed from 1,2-cyclohexanedicarboxylic anhydride, pentaerythritol and 1,4-cyclohexanediol 58.8 g (0.38 mol) of cyclohexane-1,2-dicarboxylic anhydride, 28.6 g (0.21 mol) of pentaerythritol and 12.6 g (0.11 mol) of 1,4-cyclohexanediol were charged to a 250 ml four-necked glass flask which was equipped with stirrer, internal thermometer, gas inlet tube for nitrogen, reflux condenser and vacuum attachment with cold trap. Under a gentle stream of nitrogen 0.1 g of di-n-butyltin oxide, available commercially as Fascat® 4201 from Atochem, was added and the mixture was heated using an oil bath to an internal temperature of 155° C. A reduced pressure of 60 mbar was applied in order to separate off water formed during the reaction. The reaction mixture was held at the stated temperature and pressure for 9 hours. On cooling, the reaction product was obtained as a transparent solid. The analytical data are summarized in table 1.

Example 2

Polyester Formed from adipic acid, pentaerythritol and 1,4-cyclohexanediol 58.2 g (0.40 mol) of adipic acid, 22.6 g (0.17 mol) of pentaerythritol and 22.8 g (0.16 mol) of 1,4-cyclohexanediol were charged to the reaction vessel specified in example 1 and gassed with nitrogen. Following the addition of 0.1 g of di-n-butyltin oxide the mixture was heated using an oil bath to an internal temperature of 135° C. A reduced pressure of 70 mbar was applied in order to separate off water formed during the reaction. The reaction mixture was held at the stated temperature and pressure for 4 hours. Cooling gave the hyperbranched polyester as a clear, very viscous liquid. The analytical data are summarized in table 1.

Example 3

Polyester Formed from adipic acid, pentaerythritol and 1,4-cyclohexanedimethanol 55.6 g (0.38 mol) of adipic acid, 21.6 g (0.16 mol) of pentaerythritol and 22.8 g (0.16 mol) of 1,4-cyclohexanedimethanol were charged to the reaction vessel specified in example 1 and gassed with nitrogen. Following the addition of 0.1 g of di-n-butyltin oxide the mixture was heated using an oil bath to an internal temperature of 135° C. A reduced pressure of 60 mbar was applied in order to separate off water formed during the reaction. The reaction mixture was held at the stated temperature and pressure for 4.5 hours. Cooling to room temperature gave the polyester as a clear, very viscous liquid. The analytical data are summarized in table 1.

Example 4

Polyester Formed from phthalic anhydride, pentaerythritol and 1,4-cyclohexane-dimethanol 55.9 g (0.38 mol) of phthalic anhydride, 21.4 g (0.16 mol) of pentaerythritol and 22.7 g (0.16 mol) of 1,4-cyclohexanedimethanol were charged to the reaction vessel specified in example 1 and gassed with nitrogen. Following the addition of 0.1 g of di-n-butyltin oxide the mixture was heated using an oil bath to an internal temperature of 150° C. A reduced pressure of 60 mbar was applied in order to separate off water formed during the reaction. The reaction mixture was held at the stated temperature and pressure for 4 hours. Cooling gave the hyperbranched polyester in the form of a clear solid. The analytical data are summarized in table 1.

Example 5

Polyester Formed from phthalic anhydride, pentaerythritol and 1,4-cyclohexanediol 59.1 g (0.40 mol) of phthalic anhydride, 15.4 g (0.11 mol) of pentaerythritol and 25.5 g (0.16 mol) of 1,4-cyclohexanediol were charged to the reaction vessel specified in example 1 and gassed with nitrogen. Following the addition of 0.1 g of di-n-butyltin oxide the mixture was heated using an oil bath to an internal temperature of 150° C. A reduced pressure of 70 mbar was applied in order to separate off water formed during the reaction. The reaction mixture was held at the stated temperature and pressure for 7 hours. Cooling gave the hyperbranched polyester in the form of a clear solid. The analytical data are summarized in table 1.

Example 6

Polyester Formed from succinic acid, phthalic anhydride, butanediol and triglycerol 150 g (1.27 mol) of succinic acid, 8.2 g (0.055 mol) of phthalic anhydride, 163.6 g (0.55 mol) of butanediol and 265.4 g (1.105 mol) of triglycerol (Polyglycerol-3, Solvay) were charged to a 1000 ml four-necked glass flask equipped with stirrer, internal thermometer, gas inlet tube, reflux condenser and vacuum connection with cold trap. Under a gentle stream of nitrogen gas, 1000 ppm of sulfuric acid, in the form of 0.42 ml of a 2% aqueous solution, were added and the reaction mixture was heated using an oil bath to an internal temperature of 130° C. A reduced pressure of 20 mbar was applied in order to separate off water formed during the reaction. The reaction mixture was held at the stated temperature and pressure for 15 hours. Cooling gave the polyester in the form of a clear solid. The analytical data are summarized in table 1.

Example 7

Polyester Formed from adipic acid, trimethylolpropane and 1,4-cyclohexanedimethanol 233.8 g (1.6 mol) of adipic acid, 118.1 g (0.88 mol) of trimethylolpropane and 22.8 g (0.16 mol) of 1,4-cyclohexanedimethanol were charged to the reaction vessel specified in example 6 and gassed with nitrogen. Following the addition of 0.41 g of di-n-butyltin oxide the mixture was heated using an oil bath to an internal temperature of 115° C. A reduced pressure of 100 mbar was applied in order to separate off water formed during the reaction. The reaction mixture was held at the stated temperature and pressure for 5.5 hours. Cooling gave the product as a clear, viscous liquid. The analytical data are summarized in table 1.

Example 8

Polyester Formed from adipic acid, pentaerythritol and 1,4-cyclohexanedimethanol 233.8 g (1.6 mol) of adipic acid, 119.8 g (0.88 mol) of pentaerythritol and 63.5 g (0.44 mol) of 1,4-cyclohexanedimethanol were charged to the reaction vessel specified in example 6 and gassed with nitrogen. Following the addition of 0.42 g of di-n-butyltin oxide the mixture was heated using an oil bath to an internal temperature of 115° C. A reduced pressure of 100 mbar was applied in order to separate off water formed during the reaction. The reaction mixture was held at the stated temperature and pressure for 4 hours. Cooling gave the polyester as a clear, very viscous liquid. The analytical data are summarized in table 1.

Example 9

Polyester Formed from 1,2-cyclohexanedicarboxylic acid, trimethylolpropane and 1,4-cyclohexanedimethanol 1480 g (9.6 mol) of cyclohexane-1,2-dicarboxylic anhydride, 354.2 g (2.6 mol) of trimethylolpropane and 761.4 g (5.3 mol) of 1,4-cyclohexanedimethanol were charged to a 4 l four-necked glass flask equipped with stirrer, internal thermometer, gas inlet tube, reflux condenser and vacuum connection with cold trap. Under a gentle stream of nitrogen gas, 2.6 g of di-n-butyltin oxide were added and the reaction mixture was heated using an oil bath to an internal temperature of 115° C. A reduced pressure of 110 mbar was applied in order to separate off water formed during the reaction. The reaction mixture was held at the stated temperature and pressure for 10 hours. Cooling gave the product as a clear solid. The analytical data are summarized in table 1.

Example 10

Polyester Formed from 1,2-cyclohexanedicarboxylic anhydride, glycerol and 1,4-cyclohexanedimethanol 1790 g (11.6 mol) of cyclohexane-1,2-dicarboxylic anhydride, 588 g (6.39 mol) of glycerol and 460.7 g (3.2 mol) of 1,4-cyclohexanedimethanol were charged to the reaction vessel specified in example 9 and gassed with nitrogen. Following the addition of 2.8 g of di-n-butyltin oxide the mixture was heated using an oil bath to an internal temperature of 150° C. A reduced pressure of 100 mbar was applied in order to separate off water formed during the reaction. The reaction mixture was held at the stated temperature and pressure for 12 hours. Cooling gave the hyperbranched polyester in the form of a clear solid. The analytical data are summarized in table 1.

Example 11

Polyester Formed from 1,2-cyclohexanedicarboxylic anhydride, pentaerythritol and 1,4-cyclohexanedimethanol 1480 g (9.6 mol) of cyclohexane-1,2-dicarboxylic anhydride, 719 g (5.3 mol) of pentaerythritol and 381 g (2.6 mol) of 1,4-cyclohexanedimethanol were charged to the reaction vessel specified in example 9 and gassed with nitrogen. Following the addition of 2.6 g of di-n-butyltin oxide the mixture was heated using an oil bath to an internal temperature of 150° C. A reduced pressure of 200 mbar was applied in order to separate off water formed during the reaction. The reaction mixture was held at the stated temperature and pressure for 11 hours. Cooling gave the hyperbranched polyester in the form of a clear solid. The analytical data are summarized in table 1.

Example 12

Polyester Formed from adipic acid, glycerol and 1,4-cyclohexanedimethanol 233.8 g (1.6 mol) of adipic acid, 81 g (0.88 mol) of glycerol and 63.5 g (0.44 mol) of 1,4-cyclohexanedimethanol were charged to the reaction vessel specified in example 6 and gassed with nitrogen. Following the addition of 0.38 g of di-n-butyltin oxide the mixture was heated using an oil bath to an internal temperature of 130° C. A reduced pressure of 110 mbar was applied in order to separate off water formed during the reaction. The reaction mixture was held at the stated temperature and pressure for 8 hours. Cooling gave the hyperbranched polyester as a clear, viscous liquid. The analytical data are summarized in table 1.

Example 13

Polyester Formed from succinic acid, trimethylolpropane and 1,4-cyclohexane-dimethanol 188.9 g (1.6 mol) of succinic acid, 118.1 g (0.88 mol) of trimethylolpropane and 63.5 g (0.44 mol) of 1,4-cyclohexanedimethanol were charged to the reaction vessel specified in example 6 and gassed with nitrogen. Following the addition of 0.37 g of di-n-butyltin oxide the mixture was heated using an oil bath to an internal temperature of 130° C. A reduced pressure of 110 mbar was applied in order to separate off water formed during the reaction. The reaction mixture was held at the stated temperature and pressure for 8 hours. Cooling gave the hyperbranched polyester as a clear, viscous liquid. The analytical data are summarized in table 1.

Example 14

Polyester Formed from succinic acid, glycerol and 1,4-cyclohexanedimethanol 188.9 g (1.6 mol) of succinic acid, 40.5 g (0.44 mol) of glycerol and 126.9 g (0.88 mol) of 1,4-cyclohexanedimethanol were charged to the reaction vessel specified in example 6 and gassed with nitrogen. Following the addition of 0.36 g of di-n-butyltin oxide the mixture was heated using an oil bath to an internal temperature of 130° C. A reduced pressure of 200 mbar was applied in order to separate off water formed during the reaction. The reaction mixture was held at the stated temperature and pressure for 5 hours. Cooling gave the polyester as a clear, very viscous liquid. The analytical data are summarized in table 1.

Example 15

Polyester Formed from succinic acid, glycerol and 1,4-cyclohexanedimethanol 377.9 g (3.2 mol) of succinic acid, 162.1 g (1.76 mol) of glycerol and 126.9 g (0.88 mol) of 1,4-cyclohexanedimethanol were charged to the reaction vessel specified in example 6 and gassed with nitrogen. Following the addition of 0.67 g of di-n-butyltin oxide the mixture was heated using an oil bath to an internal temperature of 140° C. A reduced pressure of 300 mbar was applied in order to separate off water formed during the reaction. The reaction mixture was held at the stated temperature and pressure for 3 hours. Cooling gave the polyester as a clear, viscous liquid. The analytical data are summarized in table 1.

Example 16

Polyester Formed from succinic acid, pentaerythritol and 1,4-cyclohexanedimethanol 188.9 g (1.6 mol) of succinic acid, 119.8 g (0.88 mol) of pentaerythritol and 63.45 g (0.44 mol) of cyclohexanedimethanol were charged to the reaction vessel specified in example 6 and gassed with nitrogen. Following the addition of 0.37 g of di-n-butyltin oxide the mixture was heated using an oil bath to an internal temperature of 125° C. A reduced pressure of 200 mbar was applied in order to separate off water formed during the reaction. The reaction mixture was held at the stated temperature and pressure for 3 hours. Cooling gave the polyester in the form of a clear solid. The analytical data are summarized in table 1.

Example 17

Polyester Formed from 1,2-cyclohexanedicarboxylic anhydride, an ethoxylated pentaerythritol and 1,4-cyclohexanedimethanol 246.7 g (1.6 mol) of cyclohexane-1,2-dicarboxylic anhydride, 80 g (0.1 mol) of an ethoxylated pentaerythritol (Polyol PP® 150 from Perstorp) and 126.9 g (0.88 mol) of 1,4-cyclohexanedimethanol were charged to the reaction vessel specified in example 6 and gassed with nitrogen. Following the addition of 0.44 g of di-n-butyltin oxide the mixture was heated using an oil bath to an internal temperature of 135° C. A reduced pressure of 150 mbar was applied in order to separate off water formed during the reaction. The reaction mixture was held at the stated temperature and pressure for 11 hours. Cooling gave the product as a clear solid. The analytical data are summarized in table 1.

Example 18

Polyester Formed from 1,2-cyclohexanedicarboxylic anhydride, an ethoxylated trimethylolpropane and 1,4-cyclohexanedimethanol 246.7 g (1.6 mol) of cyclohexane-1,2-dicarboxylic anhydride, 242 g (0.88 mol) of an ethoxylated trimethylolpropane (Lupranol® VP9236, Elastogran GmbH) and 63.45 g (0.44 mol) of 1,4-cyclohexanedimethanol were charged to the reaction vessel specified in example 6 and gassed with nitrogen. Following the addition of 0.55 g of di-n-butyltin oxide the mixture was heated using an oil bath to an internal temperature of 150° C. A reduced pressure of 400 mbar was applied in order to separate off water formed during the reaction. The reaction mixture was held at the stated temperature and pressure for 11.5 hours. Cooling gave the product as a clear solid. The analytical data are summarized in table 1.

Example 19

Polyester Formed from phthalic anhydride, 1,2,4-benzenetricarboxylic anhydride and ethylene glycol 30.0 g (0.203 mol) of phthalic anhydride, 77.8 g (0.405 mol) of 1,2,4-benzene-tricarboxylic anhydride and 45.7 g (0.737 mol) of ethylene glycol were charged to the reaction vessel specified in example 1 and gassed with nitrogen. Following the addition of 0.1 g of di-n-butyltin oxide the mixture was heated using an oil bath to an internal temperature of 120° C. A reduced pressure of 20 mbar was applied in order to separate off water formed during the reaction. The reaction mixture was held at the stated temperature and pressure for 7.5 hours. This gave the hyperbranched polyester in the form of a clear solid. The analytical data are summarized in table 1.

Example 20

Polyester Formed from phthalic anhydride, 1,2,4-benzenetricarboxylic anhydride and ethylene glycol 60.0 g (0.405 mol) of phthalic anhydride, 38.9 g (0.203 mol) of 1,2,4-benzene-tricarboxylic anhydride and 45.7 g (0.737 mol) of ethylene glycol were charged to the reaction vessel specified in example 1 and gassed with nitrogen. Following the addition of 0.1 g of di-n-butyltin oxide the mixture was heated using an oil bath to an internal temperature of 120° C. A reduced pressure of 20 mbar was applied in order to separate off water formed during the reaction. The reaction mixture was held at the stated temperature and pressure for 6 hours. This gave the hyperbranched polyester in the form of a clear solid. The analytical data are summarized in table 1.

TABLE 1

| | Inventive polyesters | | | |
|---|---|---|---|---|
| Example no. | $M_w/M_n$ (GPC) | Glass transition temperature ($T_g$, ° C.) | Acid no. (mg KOH/g) | OH number (mg KOH/g) |
| 1 | 4050/2110 | 54.0 | 89 | 124 |
| 2 | 5220/1750 | −16.9 | 136 | 269 |
| 3 | 15 130/2830 | −21.6 | 101 | 223 |
| 4 | 4980/1840 | 54.0 | 58 | n.d. |
| 5 | 3080/1490 | 55.0 | 77 | n.d. |

TABLE 1-continued

| | Inventive polyesters | | | |
|---|---|---|---|---|
| Example no. | $M_w/M_n$ (GPC) | Glass transition temperature ($T_g$, ° C.) | Acid no. (mg KOH/g) | OH number (mg KOH/g) |
| 6 | 11 900/3020* | n.d. | 18 | n.d. |
| 7 | 13 190/3020 | −25.0 | 92 | n.d. |
| 8 | 10 480/2520 | −19.4 | 131 | 317 |
| 9 | 1360/1040 | n.d. | 137 | 78 |
| 10 | 2580/1320 | 28.3 | 160 | 187 |
| 11 | 3330/1410 | 51.0 | 92 | 149 |
| 12 | 12 640/2940 | −24.1 | 99 | 154 |
| 13 | 18 030/3170 | −26.0 | 87 | 144 |
| 14 | 2520/960 | −10.0 | 136 | 125 |
| 15 | 1360/640 | −23.3 | 196 | 257 |
| 16 | 2130/980 | 1.9 | 118 | 333 |
| 17 | 1840/700 | 5.0 | 168 | n.d. |
| 18 | 1700/740 | n.d. | 37 | n.d. |
| 19 | 1830/1290* | 16.9 | 220 | 152 |
| 20 | 1840/1290* | 1.6 | 145 | 164 | n.d. = not determined

Analysis of the Inventive Products:

The polyesters were analyzed by gel permeation chromatography using a refractometer detector. The mobile phase used was tetrahydrofuran or, in the case of the molar masses labeled *, hexafluoroisopropanol, and the standard used for determining the molecular weight was polymethyl methacrylate (PMMA).

The glass transition temperatures were determined by differential scanning calorimetry (DSC), with the second heating curve being the curve evaluated.

The acid number and the OH number were determined in this specification in accordance with DIN 53240, part 2.

Examples 21-31

Use of the Inventive Polyesters in Paint Formulations

Preparation of the Paints:

All paint mixtures were prepared with a stoichiometric ratio of isocyanate groups to alcohol groups (index 100) at room temperature.

The viscosity was adjusted to a flow time of 20 s in accordance with ISO 2431 and EN 535 in the DIN 4 cup. The paints were knife-coated onto a sheet metal substrate at room temperature, using a box-type coating bar, to give a wet film thickness of 180 μm. The paint film thickness after drying was on average about 40 μm.

The comparative examples considered were paints obtained from commercial raw materials.

Table 2 gives an overview of the composition of the inventive examples and of the comparative paints.

Test Methods:

The paint properties were investigated after 24 hours' storage of the painted sheets in a controlled-climate room at 23° C. and at 50% relative atmospheric humidity.

All of the paints investigated were clear and transparent after curing at room temperature, at 80° C. and at 130° C. All of the paints investigated, after curing at 130° C. for a period of 30 minutes, gave at least 100 double rubs in the acetone double-rub test.

Flow time: measured on the basis of ISO 2431 and EN 535 in the DIN 4 cup at room temperature. The result reported is the time from the beginning of flow to the breaking of the string of liquid, in seconds.

Acetone double-rub test: an acetone-soaked cotton pad was rubbed in back-and-forth strokes by hand until the paint coat had been rubbed through down to the sheet metal. The number of double rubs required to achieve this is reported. At 100 rubs the test was terminated.

Erichsen cupping: cupping test in accordance with DIN EN ISO 1520, in mm of cupping.

Etch test with sulfuric acid: using a pipette, 25 µm drops were applied to a gradient oven sheet, which was heated in the gradient oven at 30-75° C. for 30 minutes. The metal sheet was subsequently washed off with water and dried. The result reported is the lowest temperature at which incipient etching was still observable with the eye.

Adhesion with cross-cut in accordance with DIN 53151, a rating of 0 denotes the best score, a rating of 5 the worst score. In this context see also Goldberg and Streitberger, BASF Handbuch Lacktechnik, Vincentz-Verlag Hannover, 2002, page 395.

Nonvolatiles content (NVC): 1 g of the paint mixture was dried in a forced-air oven at 125° C. for one hour and the residue weight was determined relative to the initial value (=100%).

König pendulum attenuation, in number of swings, based on DIN EN ISO 1522.

Scrub test, scratch resistance in the scotch-brite test: a fiber web (Scotchbrite®, 7448 type S ultrafine) was attached using double-sided adhesive tape to the head of a 500 g fitter's hammer. The hammer was held at the end of the shaft by two fingers and was drawn backward and forward over the paint film in a line, using uniform back-and-forth strokes, without tipping and without additional application of force. After 50 back-and-forth strokes, subsequent heating in a forced-air oven at 60° C. for 60 minutes (reflow) and storage for 4 h at 23° C. and 50% relative atmospheric humidity, the gloss was measured transverse to the direction of abrasion. The fiber web was replaced by a new web after each test.

Gloss measurement: gloss meter Mikro TRI-Gloss at 60° incident angle.

Result of the Paint Investigations at the 130° C. Curing Temperature

In general the use of the hyperbranched polyesters results in an improvement in the hardness, with comparable elasticity and cross-cut adhesion, and in an improvement in the scratch resistance without any drop in chemical resistance (see table 3).

In a direct comparison between comparative example 21, a paint system notable for its very good flexibility (Erichsen cupping), and example 22, replacing the polyacrylate polyol with a hyperbranched polyester of the invention results in a much greater hardness in conjunction with improved elasticity. There are likewise improvements in the scratch resistance and the reflow after 50 back-and-forth strokes.

By replacing the HDI-based polyisocyanate with the harder, IPDI-based isocyanate, the hardness is increased markedly, with comparable elasticity and cross-cut adhesion, and additionally an improved scratch resistance and an improved acid resistance are found (example 23). Adding a hyperbranched polyisocyanate crosslinker likewise further improves the scratch resistance (example 24).

In examples 25 (comparative) and 26 it becomes clear that in binder mixtures as well, by replacing an acrylate component with a polyester of the invention, it is possible to achieve distinct increases in coating performance in respect of hardness, flexibility, chemical resistance and scratch resistance.

Examples 29-31 show that, as compared with conventional, polyester-based paint systems (comparative example 28) a substantially improved performance is attainable in respect of hardness, flexibility and adhesion. In the case of scratch resistance as well there are distinct advantages evident, even over an acrylate-based system (comparative example 27).

Result of the Paint Investigations at the 80° C. Curing Temperature

The systems with the polyesters of the invention as binders give a value of 100 in the acetone double-rub test for 30-minute curing at 80° C. in all of the inventive examples except for example 22. The acid resistance is consistently better than for the comparative examples, and the scratch resistance too is significantly improved.

TABLE 2

Composition of the paint systems, initial weights in g

| | Example | | | | | | | | | | |
|---|---|---|---|---|---|---|---|---|---|---|---|
| | 21 (comp.) | 22 | 23 | 24 | 25 (comp.) | 26 | 27 (comp.) | 28 (comp.) | 29 | 30 | 31 |
| Macrynal SM 636/70BAC | 93.3 | | | 31.1 | 32.0 | | 71.4 | | 35.7 | | |
| Macrynal SM 600/60XBAC | | | | | 48.0 | 48.0 | | | | | |
| Desmophen 680 BA | | | | | | | | 85.7 | | | |
| Polyester from example 1, 50% in butyl acetate | | 143.3 | 80.8 | 47.5 | | | | | | | |
| Polyester from example 11, 60% in butyl acetate | | | | | | 33.8 | | | 37.8 | 89.7 | |
| Polyester from example 9, 60% in butyl acetate | | | | | | | | | | | 85.6 |
| Basonat HI 100 | 30.0 | 30.0 | | 10.0 | | | | | | | |
| Vestanat T 1890 | | | | | 36.8 | 36.8 | 42.1 | 27.3 | 42.1 | 50.0 | 25.0 |
| Basonat HYB | | | 50.0 | 29.4 | | | | | | | |
| Butyl acetate | 75.0 | 38.5 | 74.4 | 65.0 | 49.0 | 41.0 | 53.0 | 36.0 | 38.0 | 50.0 | 25.0 |
| NVC [%] | 51.3 | 48.0 | 34.3 | 40.0 | 46.4 | 46.9 | 47.4 | 53.1 | 50.2 | 46.8 | 50.8 |
| Flow time [s] | 20.0 | 20.3 | 20.0 | 20.3 | 19.8 | 20.0 | 20.2 | 20.1 | 19.7 | 20.0 | 19.6 |

TABLE 3

Paint investigations after curing at 130° C. for 30 minutes

| | Example | | | | | | | | | | |
|---|---|---|---|---|---|---|---|---|---|---|---|
| | 21 (comp.) | 22 | 23 | 24 | 25 (comp.) | 26 | 27 (comp.) | 28 (comp.) | 29 | 30 | 31 |
| Pendulum hardness | 148 | 156 | 162 | 156 | 146 | 151 | 149 | 136 | 149 | 159 | 166 |
| Erichsen cupping [mm] | 8.6 | 8.8 | 8.2 | 7.8 | 4.8 | 6.0 | 1.9 | 0.5 | 3.8 | 0.6 | 0.1 |
| Cross-cut [rating] | 0.5 | 0 | 0 | 0 | 4 | 4.5 | 5 | 5 | 2 | 3 | 5 |
| Etch test sulfuric acid [° C.] | 49 | 46 | 54 | 52 | 51 | 54.5 | 64.5 | 63.5 | 68 | 65.5 | 57 |
| Scrub test 50 DS* gloss 60° | 19.5 | 32.6 | 30.4 | 34.2 | 19.2 | 36.1 | 27.0 | 13.5 | 41.1 | 41.4 | 31.0 |
| Scrub test 50 DS, reflow gloss 60° | 31.4 | 38.3 | 34.9 | 38.6 | 19.6 | 38.7 | 28.8 | 15.7 | 43.9 | 43.1 | 31.2 |

*DS = double (i.e., back-and-forth) strokes

TABLE 4

Paint investigations after curing at 80° C. for 30 minutes

| | Example | | | | | | | | | | |
|---|---|---|---|---|---|---|---|---|---|---|---|
| | 21 (comp.) | 22 | 23 | 24 | 25 (comp.) | 26 | 27 (comp.) | 28 (comp.) | 29 | 30 | 31 |
| Pendulum hardness | 135 | 99 | 138 | 151 | 144 | 142 | 144 | 139 | 144 | 137 | 140 |
| Erichsen cupping [mm] | 8.9 | >9.0 | 9.0 | 8.7 | 0.5 | 6.7 | 0.1 | 0.3 | 0.5 | 0.1 | 0.2 |
| Cross-cut [rating] | 0 | 2 | 5 | 0.5 | 5 | 5 | 5 | 5 | 5 | 5 | 5 |
| Acetone back and forth stroke test [strokes] | 30 | 88 | 100 | 100 | 18 | 100 | 16 | 64 | 100 | 100 | 100 |
| Etch test sulfuric acid [° C.] | 43.0 | 44.0 | | | 44.0 | 46.0 | 49.5 | 62.5 | 58.5 | 54.0 | 48.5 |
| Scrub test 50 DS, gloss 60° | 6.3 | 26.8 | 22.6 | 20.2 | | | | | | | |
| Scrub test 50 DS, reflow gloss 60° | 6.6 | 26.8 | 26.6 | 23.8 | | | | | | | |

Ingredients Used:
- Macrynal® SM 636/70 BAC, UCB, polyacrylate polyol, 70% in butyl acetate, OH number about 135 mg KOH/g.
- Macrynal® SM 600/60 XBAC, UCB, polyacrylate polyol, 60% in xylene/butyl acetate, OH number about 100 mg KOH/g.
- Desmophen® 680 BA, Bayer AG, branched polyesterol, 70% in butyl acetate, OH number about 73 mg KOH/g
- Basonat® HI 100, BASF AG, polyisocyanate (isocyanurate) based on hexamethylene diisocyanate, NCO content about 22.0%.
- Vestanat® T 1890, Degussa AG, polyisocyanate (isocyanurate) based on isophorone diisocyanate, 70% in butyl acetate/Solvesso 100, NCO content about 12.0%.
- Basonat® HYB, BASF AG, hyperbranched polyisocyanate, 60% in butyl acetate. NCO content about 7.2%.

Printing Inks with the Highly Branched or Hyperbranched Polyesters of the Invention The quality of the printing inks was determined on the basis of the adhesion to different print media.

Adhesive-tape Strength Measurement Method

The "adhesive-tape strength" test method is used to determine the adhesion of a film of printing ink to the print medium.

Sample Preparation

The ink, diluted to print viscosity, is printed onto the specified medium or applied using a 6 μm doctor blade.

Test Procedure

A strip of adhesive tape 19 mm wide (Tesa®, Article BDF4104, Beiersdorf AG) is adhered to the film of printing ink, pressed on uniformly and pulled off again after 10 seconds. This operation is repeated on the same site on the test specimen 4 times, using a new strip of tape each time. Each tape strip is subsequently adhered to white paper or, in the case of white inks, to black paper. The test is performed immediately following application of the ink.

Evaluation

The surface of the test specimen is inspected for damage. The scoring is from 1 (very poor) to 5 (very good).

The following formulas (in parts by weight) were chosen for the examples:

Standard Formula A (Comparative)
70.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
12.5 ethanol
6.0 conventional polyurethane PUR 7317 (BASF)

Formula I (Inventive)
70.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
12.5 ethanol
6.0 polymer from example 12 (table 1), as a 75% strength solution in ethanol

TABLE 5

Standard binder in comparison to polymer from example 12 (table 1)

| | | Print substrate (film) | |
|---|---|---|---|
| Example | System | Polypropylene | Polyamide Emblem 1500 |
| 32 (comparative) | Standard formula A | 1 | 2 |
| 33 (inventive) | Formula 1 | 4 | 5 |

Determination of the Composite Strength of Laminates:

Laminated packaging was produced by laminating printed polymer films, such as polyamide, polyethylene or polypropylene films, to other types of film, such as metal foils or else polymeric films, for example. Important performance properties of such laminates for use as laminated packaging include not only the strength of the laminate under normal storage conditions but also the strength of the laminate under harsh conditions, such as when heated or sterilized.

The quality of the printing inks of the invention was assessed by determining the composite strength. By composite strength is meant the determination of the bond adhesion between two films or metal foils joined by lamination or extrusion.

Measuring and Test Apparatus:
Tensile strength tester from Zwick
Punch (width: 15 mm)

Sample Preparation:

At least 2 strips (15 mm wide) of each material under test must be cut longitudinally and transversely with respect to the film web. In order to separate the composite the ends of the punched-out strips can be immersed in an appropriate solvent (e.g., 2-butanone) until the materials part from one another. Thereafter the specimen must be carefully dried again.

Test Procedure:

The delaminated ends of the test specimens are clamped into the tensile strength tester. The less stretchable film should be inserted into the upper clamp. When the machine is started up the end of the specimen should be held at right angles to the direction of tension, thereby ensuring constant tension. The pulling speed is 100 mm/min, the pulling angle of the separated films with respect to the unparted complex is 90°.

Evaluation:

The composite strength figure is read off as an average, and recorded in N/15 mm.

Sample Preparation:

The ink, diluted to print viscosity, is printed onto the specified print substrate polyamide (Emblem 1500) or applied using a 6 μm doctor blade. In parallel with this the polyethylene laminating film is coated with the adhesive/hardener mixture Morfree A415 (adhesive) and C90 (hardener, Rohm & Haas), in a weight ratio of 100:40, so as to give a film thickness of approximately 6 μm (corresponding to about 2.5 g/m$^2$). The two films are then pressed together so that the printing ink and the adhesive come into contact. After pressing, the composite films are stored at 60° C. for 5 days.

The formulas chosen for the examples (in parts by weight) were as follows:

Standard Formula B (Comparative):
13.0 pigment Heliogen® Blue D 7080 (BASF AG)
15.0 binder (polyvinylbutyral)
3.0 additive (polyethylenimine, BASF AG)
69.0 ethanol Formula I (Inventive)
70.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
12.5 ethanol
6.0 polymer from example 12 (table 1), as a 75% strength solution in ethanol

Example 34

Composite Strength Figures for the Polyamide/Polyethylene Laminate

| | Composite strength (N/15 mm): |
|---|---|
| Standard system B (comparative): | 3.93 |
| Formula 1 (inventive): | 7.30 |

The invention claimed is:

1. A high functionality, highly branched or hyperbranched polyester produced by a process comprising an acid catalyzed reaction of:
   (1) at least one aliphatic, cycloaliphatic, araliphatic or aromatic dicarboxylic acid ($A_2$); and
   (2) at least one aliphatic, cycloaliphatic, araliphatic or aromatic diol ($B_2$); with
   (3A) at least one aliphatic, cylcoaliphatic, araliphatic or aromatic polyol ($C_x$) having three or more hydroxyl groups; and
   (4) an optional functionalized building block (E); and
   (5) an optional α, β-unsaturated carboxylic acid (F),
   wherein the acid catalyzed reaction is carried out in the presence of at least one acidic catalyst, with the proviso that said acidic catalyst is not an enzyme,
   wherein a molar ratio of hydroxyl groups to carboxylic acid groups is from 5:1 to 1:5,
   wherein the polyester has a number average molecular weight of at least 500 g/mol and a polydispersity index of from 1.2 to 10,
   wherein the polyester has a degree of branching of from 10% to 99.9%, and
   wherein the polyester has a glass transition temperature ($T_g$) of from -40° C. to 100° C. as measured by differential scanning calorimetry (DSC) in accordance with ASTM 3418/82.

2. A process for producing the high functionality, highly branched or hyperbranched polyester according to claim 1, wherein said process comprises an acid catalyzed reaction of:
   (1) at least one aliphatic, cycloaliphatic, araliphatic or aromatic dicarboxylic acid ($A_2$); and
   (2) at least one aliphatic, cycloaliphatic, araliphatic or aromatic diol ($B_2$); with
   (3A) at least one aliphatic, cylcoaliphatic, araliphatic or aromatic polyol ($C_x$ having three or more hydroxyl groups; and
   (4) an optional functionalized building block (E); and
   (5) an optional α, β-unsaturated carboxylic acid (F),
   wherein the acid catalyzed reaction is carried out in the presence of at least one acidic catalyst, with the proviso that the acidic catalyst is not an enzyme, wherein a molar ratio of hydroxyl groups to carboxylic acid groups is from 5:1 to 1:5, wherein the polyester has a number average molecular weight of at least 500 g/mol and a polydispersity index of from 1.2 to 10, wherein the polyester has a degree of branching of from 10% to 99.9%, and wherein the polyester has a glass transition temperature ($T_g$) of from -40° C. to 100° C. as measured by differential scanning calorimetry (DSC) in accordance with ASTM 3418/82.

3. The polyester according to claim 1, wherein the dicarboxylic acid ($A_2$) is one or more dicarboxylic acids selected from the group consisting of malonic acid, succinic acid, glutaric acid, adipic acid, 1,2-cyclohexanedicarboxylic acid, 1,3-cyclohexanedicarboxylic acid, 1,4-cyclohexanedicarboxylic acid, phthalic acid, isophthalic acid, terephthalic acid and monoalkyl or dialkyl esters thereof.

4. The polyester according to claim 1, wherein the diol ($B_2$) is one or more diols selected from the group consisting of ethylene glycol, 1,2-propanediol, 1,3-propanediol, 1,4-butanediol, 1,5-pentanediol, 1,6-hexanediol, 1,8-octanediol, 1,2-cyclohexanediol, 1,3-cyclohexanediol, 1,4-cyclohexanediol, 1,3-bis(hydroxymethyl)cyclohexane, 1,4-bis(hydroxymethyl)cyclohexane, diethylene glycol, triethylene glycol, dipropylene glycol and tripropylene glycol.

5. The polyester according to claim 1, wherein the polyol ($C_x$ is reacted with the dicarboxylic acid ($A_2$) and the diol ($B_2$), and wherein the polyol ($C_x$ is one or more polyols selected from the group consisting of glycerol, diglycerol, triglycerol, trimethylolethane, trimethylolpropane, 1,2,4-butanetriol, pentaerythritol and tris(hydroxyethyl)isocyanurate.

6. The polyester according to claim 1, wherein the functionalized building block (E) is reacted with the dicarboxylic acid ($A_2$) and the diol ($B_2$), and wherein the functionalized building block (E) is one or more compounds having a functional group selected from the group consisting of a mercapto group, a primary amino group, a secondary amino group, a tertiary amino group, an ether group, a carbonyl group, a sulfonic acid or derivative thereof, a sulfinic acid or derivative thereof, a phosphonic acid or derivative thereof, a phosphinic acid or derivative thereof, a silane group and a siloxane group.

7. The polyester according to claim 1, wherein the α,β-unsaturated carboxylic acid (F) is reacted with the dicarboxylic acid ($A_2$) and the diol ($B_2$), and wherein the α,β-unsaturated carboxylic acid (F) comprises from 8 to 20 carbon atoms.

8. The polyester according to claim 1, wherein the αβ-unsaturated carboxylic acid (F) is reacted with the dicarboxylic acid ($A_2$) and the diol ($B_2$), and wherein the α,β-unsaturated carboxylic acid (F) is one or more α,β-unsaturated carboxylic acids selected from the group consisting of acrylic acid, methacrylic acid, ethacrylic acid, α-chloroacrylic acid, maleic acid, fumaric acid, itaconic acid, crotonic acid, citraconic acid, mesaconic acid and glutaconic acid.

9. The polyester according to claim 1, wherein the acidic catalyst is one or more acidic catalysts selected from the group consisting of an inorganic acidic catalyst, an organometallic acidic catalyst and an organic acidic catalyst, with the proviso that said organic acidic catalyst is not an enzyme.

10. The polyester according to claim 1, wherein the molar ratio of hydroxyl groups to carboxylic acid groups is from 4:1 to 1:4.

11. The polyester according to claim 1, wherein the molar ratio of hydroxyl groups to carboxylic acid groups is from 3:1 to 1:3.

12. The polyester according to claim 1, wherein the polyester has a number average molecular weight of 750-30,000 g/mol and a polydispersity index of 1.5-10.

13. The polyester according to claim 1, wherein the polyester has a sum of hydroxyl number and carboxylic acid number of up to 500 mg KOH/g as measure in accordance with part 2 of DIN 53240.

14. The polyester according to claim 1, wherein the polyester has a viscosity of not more than 100 Pa·s at 80° C. as measured in accordance with DIN EN 3219.

15. The polyester according to claim 1, wherein the polyester has a glass transition temperature ($T_g$) of from 0° C. to 100° C. as measured by differential scanning calorimetry (DSC) in accordance with ASTM 3418/82.

16. The polyester according to claim 1, wherein the polyester has a glass transition temperature ($T_g$) of from -40° C. to 60° C. as measured by differential scanning calorimetry (DSC) in accordance with ASTM 3418/82.

17. The polyester according to claim 1, wherein the polyester has a glass transition temperature ($T_g$) of from 0° C. to 60° C. as measured by differential scanning calorimetry (DSC) in accordance with ASTM 3418/82.

18. The polyester according to claim 1, wherein the polyester has 10-100 terminal and/or pendent functional groups selected from the group consisting of hydroxyl groups and/or carboxylic acid groups.

19. A product comprising the polyester according to claim 1, wherein the product is selected from the group consisting of a printing ink, a paint, a sealant, an adhesive material, a coating material, a covering material, a foam material, a thixotropic agent, a binder, a polyaddition building block and a polycondensation building block.

* * * * *